US012659120B2

(12) United States Patent
Zhang et al.

(10) Patent No.: US 12,659,120 B2
(45) Date of Patent: Jun. 16, 2026

(54) RESOURCE MAPPING METHOD AND APPARATUS

(71) Applicant: HUAWEI TECHNOLOGIES CO., LTD., Shenzhen (CN)

(72) Inventors: Peng Zhang, Reading (GB); Jiayin Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 310 days.

(21) Appl. No.: 18/479,564

(22) Filed: Oct. 2, 2023

(65) Prior Publication Data

US 2024/0031108 A1     Jan. 25, 2024

Related U.S. Application Data

(63) Continuation of application No. PCT/CN2022/082956, filed on Mar. 25, 2022.

(30) Foreign Application Priority Data

Apr. 2, 2021     (CN) .......................... 202110362409.8

(51) Int. Cl.
*H04L 5/00*          (2006.01)
*H04B 7/06*          (2006.01)
(52) U.S. Cl.
CPC ......... *H04L 5/0053* (2013.01); *H04B 7/0686* (2013.01); *H04L 5/0048* (2013.01)
(58) Field of Classification Search
CPC ... H04L 5/0053; H04L 5/0048; H04L 5/0023;

H04L 5/0044; H04L 5/0083; H04L 5/0094; H04B 7/0686; H04B 7/0639; H04B 7/0665; H04B 7/06952; H04W 72/046; H04W 72/1263; H04W 72/1268
See application file for complete search history.

(56) References Cited

U.S. PATENT DOCUMENTS

| | | | |
|---|---|---|---|
| 2020/0382250 A1 | 12/2020 | Choi et al. | |
| 2022/0006575 A1* | 1/2022 | Cozzo ................... | H04L 1/0073 |
| 2022/0150928 A1* | 5/2022 | Choi ..................... | H04L 5/0078 |

FOREIGN PATENT DOCUMENTS

| | | |
|---|---|---|
| CN | 109802801 A | 5/2019 |
| WO | 2022073231 A1 | 4/2022 |

* cited by examiner

*Primary Examiner* — Thai Nguyen
(74) *Attorney, Agent, or Firm* — Leydig, Voit & Mayer, Ltd.

(57)          ABSTRACT

A resource mapping method and apparatus are provided. The method includes: mapping a first data channel to a symbol other than at least one first symbol in first resource to be mapped to, and/or mapping a second data channel to a symbol other than at least one first symbol in a second resource, M second symbols are included between the first resource and the second resource, the second symbol is a symbol to which the first data channel and the second data channel are not mapped, the first symbol is adjacent to the second symbol, M is an integer and M≥0, and a sum of a quantity of first symbols and a quantity of second symbols is equal to a first threshold; and sending signals on the first data channel and the second data channel.

20 Claims, 9 Drawing Sheets

200

PDSCH

PUSCH 101    102

200

Transmit end device

Receive end device

S210: Map a first data channel to a symbol other than at least one first symbol in a first resource, and/or map a second data channel to a symbol other than at least one first symbol in a second resource S220: Send signals on the first data channel and the second data channel S230: Process the received signals (a)

(b)

(c)

(a)

(b)

(c)

First symbol to be mapped to

Second symbol to be mapped to

First symbol

Second symbol

1000

RESOURCE MAPPING METHOD AND APPARATUS

CROSS-REFERENCE TO RELATED APPLICATIONS

This application is a continuation of International Application No. PCT/CN2022/082956, filed on Mar. 25, 2022, which claims priority to Chinese Patent Application No. 202110362409.8, filed on Apr. 2, 2021. The disclosures of the aforementioned applications are hereby incorporated by reference in their entireties.

TECHNICAL FIELD

Embodiments of this application relate to the communication field, and more specifically, to a resource mapping method and apparatus.

BACKGROUND

To improve scheduling efficiency and reduce overheads of downlink control information (DCI), a multi-slot physical uplink shared channel (PUSCH) and a multi-slot physical downlink shared channel (PDSCH) are introduced in a new radio (NR) technology. In other words, one piece of DCI schedules at least one PDSCH in a plurality of consecutive slots, or one piece of DCI schedules at least one PUSCH in a plurality of consecutive slots.

In a high frequency communication system, a beamforming technology is introduced, and different beams may be considered as different resources. Same information or different information may be sent by using different beams. A beam may be used to transmit a data channel, a control channel, a sounding signal, and the like. For example, a transmit beam may be signal strength distribution formed in different directions in space after a signal is transmitted through an antenna, and a receive beam may be signal strength distribution, in different directions in space, of a radio signal received from an antenna. When a high frequency band is used, due to a small carrier wavelength of the high frequency communication system, antenna arrays formed by a plurality of antenna elements may be disposed at a transmit end and a receive end. The transmit end sends a signal by using a specific beamforming weight, so that the sent signal forms a beam with spatial directivity. In addition, the receive end receives the signal through the antenna array by using the specific beamforming weight, so that received power of the signal at the receive end can be improved, and a path loss can be avoided.

If a terminal device or a network device needs to switch a beam, a switching delay is introduced. When a subcarrier spacing (SCS) is particularly large, a length of a time unit corresponding to the subcarrier spacing is short, switching duration occupies a plurality of time units, and transmission of a PDSCH or a PUSCH cannot be performed in a beam switching process. Consequently, receiving performance of the network device or the terminal device is affected.

SUMMARY

This application provides a resource mapping method and apparatus, to provide a method and apparatus for scheduling a data channel in a plurality of time units. A receive end device and a transmit end device are expected to have a consistent understanding on resource mapping, to improve receiving performance.

According to a first aspect, a resource mapping method is provided. The method includes: mapping a first data channel to a symbol other than at least one first symbol in a first resource, and/or mapping a second data channel to a symbol other than at least one first symbol in a second resource, where a beam corresponding to the first data channel is different from a beam corresponding to the second data channel, M second symbols are included between the first resource and the second resource, the second symbol is a symbol to which the first data channel and the second data channel are not mapped, the first symbol is adjacent to the second symbol, M is an integer and M≥0, and a sum of a quantity of first symbols and a quantity of second symbols is equal to a first threshold; and sending signals on the first data channel and the second data channel.

In the foregoing solution, the sum of the quantity of first symbols and the quantity of second symbols is equal to the first threshold, the first symbol is adjacent to the second symbol, and the second symbol is a symbol to which the first data channel and/or the second data channel are/is not mapped. When the beam corresponding to the first data channel is different from the beam corresponding to the second data channel, if the quantity of the second symbol is less than the first threshold, a transmit end device and a receive end device may have inconsistent understandings on symbols to which the data channels are mapped, and consequently receiving performance is reduced. Therefore, the first data channel may be mapped to the symbol other than the at least one first symbol in the first resource, and/or the second data channel may be mapped to the symbol other than the at least one first symbol in the second resource, so that the transmit end device and the receive end device have a consistent understanding on resource mapping, and an unnecessary waste of resources is avoided.

It should be understood that the first data channel and the second data channel in the foregoing solution are sequentially scheduled in time domain. In other words, from a time domain perspective, the first data channel is sent at a moment before the second data channel, or the first data channel is sent at a moment after the second data channel. In addition, the first data channel and the second data channel may be in a same time unit, or may be in different time units. This is not limited in this application.

With reference to the first aspect, in some possible designs, the method further includes: mapping a reference signal to an $N^{th}$ symbol after a third symbol, where the $N^{th}$ symbol is determined based on a location of a symbol to which the reference signal is to be mapped, the third symbol includes the first symbol and the second symbol, and N is a positive integer greater than or equal to 1; and sending the reference signal.

In some possible designs, the reference signal may be a demodulation reference signal DMRS.

In the foregoing solution, whether to map the reference signal after the third symbol is determined based on the location to which the reference signal is to be mapped. This can effectively ensure that the transmit end device and the receive end device have a consistent understanding on mapping of the reference signal, avoid the unnecessary waste of resources, help improve channel estimation, and improve the receiving performance.

With reference to the first aspect, in some possible designs, the symbol to which the reference signal is to be mapped overlaps the third symbol; or there is no symbol, in the second resource, to which the reference signal is to be mapped, where the second resource is after the first resource;

or the first resource is after the second resource, and there is no symbol, in the first resource, to which the reference signal is mapped.

In the foregoing solution, whether to map the reference signal to the $N^{th}$ symbol after the third symbol may be determined based on whether the symbol to which the reference signal is to be mapped overlaps the third symbol or whether a symbol to which the reference signal is to be mapped exists in latter symbols to be mapped to. In other words, when the symbol to which the reference signal is to be mapped overlaps the third symbol, a symbol to which the reference signal is mapped is changed. Alternatively, if there is no symbol for the reference signal in a to-be-mapped symbol after beam switching, a symbol for the reference signal is added. This can effectively ensure that the transmit end device and the receive end device have a consistent understanding on the mapping of the reference signal, avoid the unnecessary waste of resources, help improve the channel estimation, and improve the receiving performance.

With reference to the first aspect, in some possible designs, the method further includes: if a symbol to which a first signal is to be mapped overlaps the third symbol, skipping mapping the first signal to the third symbol, where the first signal includes a control resource set.

In the foregoing solution, if the symbol to which the first signal is to be mapped overlaps the third symbol, the first signal is not mapped to the third symbol. This can effectively ensure that the transmit end device and the receive end device have a consistent understanding on mapping of the first signal, avoid the unnecessary waste of resources, help improve the channel estimation, and improve the receiving performance.

With reference to the first aspect, in some possible designs, the method further includes: starting to switch from the beam corresponding to the first data channel to the beam corresponding to the second data channel at a beam switching location, where the beam switching location is before the third symbol.

In the foregoing solution, the transmit end device starts to perform beam switching at the beam switching location, where the beam switching location is before the third symbol, or the beam switching location may be a start location of the first symbol of the third symbol. This is not limited in this application. The beam switching location provided in this application can effectively implement that the transmit end device and the receive end device have a consistent understanding on a start location of the beam switching, avoid the unnecessary waste of resources, and help improve the receiving performance.

With reference to the first aspect, in some possible designs, the first resource is determined based on first resource indication information, the second resource is determined based on second resource indication information, the first resource indication resource information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

In some possible designs, the first resource indication information may be start and length indication information SLIV, and the second resource indication information may be start and length indication information SLIV. This is not limited in this application.

In some possible designs, that the value range of the first resource indication information is determined based on the first threshold may be specifically as follows: A value range of a start S is determined based on the first threshold. For example, the start S is not less than the first threshold. This is also true for the second resource indication information, and is not limited in this application.

In the foregoing solution, the symbols to be mapped to are determined based on the resource indication information, and the resource indication information indicates the symbol to which the data channel is mapped. Alternatively, it may be understood that the indication information indicates a symbol to which the data channel is to be mapped. The value range of the indication information is determined based on the first threshold, so that the unnecessary waste of resources can be avoided, and the receiving performance can be improved.

With reference to the first aspect, in some possible designs, the first data channel is a first physical downlink shared channel PDSCH, and the second data channel is a second PDSCH; or the first data channel is a first physical uplink shared channel PUSCH, and the second data channel is a second PUSCH.

It should be understood that the first data channel and the second data channel need to be data channels of a same type, in other words, the first data channel and the second data channel are both PDSCHs or PUSCHs. When the first data channel and the second data channel are both PDSCHs, the transmit end device may be a network device. When the first data channel and the second data channel are both PUSCHs, the transmit end device is a terminal device.

With reference to the first aspect, in some possible designs, when the first data channel is the first physical downlink shared channel PDSCH, the first PDSCH is mapped to the first resource if a beam corresponding to the first PDSCH is the same as a first beam.

With reference to the first aspect, in some possible designs, when the first data channel is the first physical downlink shared channel PDSCH, the first PDSCH is not mapped to the first resource if the beam corresponding to the first PDSCH is different from the first beam.

In the foregoing solution, whether to map the first PDSCH to the first resource is determined based on whether the beam corresponding to the first PDSCH is the same as the first beam. This can avoid frequent beam switching, help the transmit end device and the receive end device have a consistent understanding on mapping of the PDSCH, avoid the unnecessary waste of resources, and improve the receiving performance.

With reference to the first aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the first aspect, in some possible designs, the first resource is before an end location of first duration, and that the first PDSCH is mapped to the first resource if a beam corresponding to the first PDSCH is the same as a first beam includes: the first PDSCH is mapped to the first resource if the beam corresponding to the first PDSCH is the same as the second beam; or the first PDSCH is not mapped to the first resource if the beam corresponding to the first PDSCH is different from the second beam, where the first duration is associated with processing time of a terminal device.

It should be understood that that the first duration is associated with processing time of a terminal device may be understood as that the terminal device determines the first duration. Specifically, the first duration is a sum of time used by the terminal device to process the first indication information and time used to perform beam switching, or the first duration is time used by the terminal device from receiving the first indication information to completing the beam switching.

In the foregoing solution, for symbols to be mapped to before the end location of the first duration, the beam corresponding to the first PDSCH is compared with the second beam. When the beam corresponding to the first PDSCH and the second beam are the same, the first PDSCH is mapped to the first resource. Otherwise, the first PDSCH is not mapped to the first resource. This can avoid frequent beam switching, help the transmit end device and the receive end device have a consistent understanding on the mapping of the PDSCH, avoid the unnecessary waste of resources, and improve the receiving performance.

With reference to the first aspect, in some possible designs, the first resource is after an end location of first duration, and that the first PDSCH is mapped to the first resource if a beam corresponding to the first PDSCH is the same as a first beam includes: the first PDSCH is mapped to the first resource if the first PDSCH has a high priority and the beam corresponding to the first PDSCH is the same as the third beam; or the first PDSCH is not mapped to the first resource if the first PDSCH has a high priority and the beam corresponding to the first PDSCH is different from the third beam, where the first duration is associated with processing time of a terminal device.

In the foregoing solution, for symbols to be mapped to after the end location of the first duration, the beam corresponding to the high-priority first PDSCH is compared with the third beam. When the beam corresponding to the high-priority first PDSCH and the third beam are the same, the first PDSCH is mapped to the first resource. Otherwise, the first PDSCH is not mapped to the first resource. This can accurately and efficiently receive a message of an emergency service, and improve transmission efficiency. In addition, this can avoid frequent beam switching, help the transmit end device and the receive end device have a consistent understanding on the mapping of the PDSCH, avoid the unnecessary waste of resources, and improve the receiving performance.

With reference to the first aspect, in some possible designs, second indication information is obtained, where the second indication information indicates that the beam corresponding to the first PDSCH is different from a beam corresponding to a third PDSCH, and the third PDSCH is before the first PDSCH.

In the foregoing solution, that second indication information is obtained may be that higher layer signaling or a physical layer configures the second indication information. After receiving the second indication information, the transmit end device learns that the beam corresponding to the first PDSCH is different from a beam corresponding to a PDSCH (the third PDSCH) scheduled at a previous moment, and needs to further determine whether the first PDSCH is the same as the first beam. This can avoid frequent beam switching, help the transmit end device and the receive end device have a consistent understanding on the mapping of the PDSCH, avoid the unnecessary waste of resources, and improve the receiving performance.

According to a second aspect, a resource mapping method is provided. The method includes: receiving signals of a first data channel and a second data channel, where a beam corresponding to the first data channel is different from a beam corresponding to the second data channel, the first data channel is mapped to a symbol other than at least one second symbol in a first resource and/or the second data channel is mapped to a symbol other than at least one second symbol in a second resource, M first symbols are included between the first resource and the second resource, the first symbol is a symbol to which the first data channel and the second data channel are not mapped, the first symbol is adjacent to the second symbol, M is an integer and M≥0, and a sum of a quantity of second symbols and a quantity of first symbols is equal to a first threshold; and processing the received signals.

In the foregoing solution, the sum of the quantity of first symbols and the quantity of second symbols is equal to the first threshold, the first symbol is adjacent to the second symbol, and the second symbol is a symbol to which the first data channel and/or the second data channel are/is not mapped. When the beam corresponding to the first data channel is different from the beam corresponding to the second data channel, if the quantity of the second symbol is less than the first threshold, a transmit end device and a receive end device may have inconsistent understandings on symbols to which the data channels are mapped, and consequently receiving performance is reduced. Therefore, the first data channel may be mapped to the symbol other than the at least one first symbol in the first resource, and/or the second data channel may be mapped to the symbol other than the at least one first symbol in the second resource, so that the transmit end device and the receive end device have a consistent understanding on resource mapping, and an unnecessary waste of resources is avoided.

It should be understood that the first data channel and the second data channel in the foregoing solution are sequentially scheduled in time domain. In other words, from a time domain perspective, the first data channel is sent at a moment before the second data channel, or the first data channel is sent at a moment after the second data channel. In addition, the first data channel and the second data channel may be in a same time unit, or may be in different time units. This is not limited in this application.

With reference to the second aspect, in some possible designs, the method further includes: receiving a reference signal, where the reference signal is mapped to an $N^{th}$ symbol after a third symbol, the $N^{th}$ symbol is determined based on a location of a symbol to which the reference signal is to be mapped, the third symbol includes the first symbol and the second symbol, and N is a positive integer greater than or equal to 1; and processing the received reference signal.

With reference to the second aspect, in some possible designs, the symbol to which the reference signal is to be mapped overlaps the third symbol; or there is no symbol, in the second resource, to which the reference signal is to be mapped, where the second resource is after the first resource; or the first resource is after the second resource, and there is no symbol, in the first resource, to which the reference signal is mapped.

With reference to the second aspect, in some possible designs, the method further includes: if a symbol to which a first signal is to be mapped overlaps the third symbol, the first signal is not mapped to the third symbol, and the first signal includes a control resource set.

With reference to the second aspect, in some possible designs, the method further includes: starting to switch from the beam corresponding to the first data channel to the beam corresponding to the second data channel at a beam switching location, where the beam switching location is before the third symbol.

With reference to the second aspect, in some possible designs, the first resource is determined based on first resource indication information, the second resource is determined based on second resource indication information, the first resource indication resource information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

In some possible designs, the first resource indication information may be start and length indication information SLIV, and the second resource indication information may be start and length indication information SLIV. This is not limited in this application.

In some possible designs, that the value range of the first resource indication information is determined based on the first threshold may be specifically as follows: A value range of a start S is determined based on the first threshold. For example, the start S is not less than the first threshold. This is also true for the second resource indication information, and is not limited in this application.

With reference to the second aspect, in some possible designs, the first data channel is a first physical downlink shared channel PDSCH, and the second data channel is a second PDSCH; or the first data channel is a first physical uplink shared channel PUSCH, and the second data channel is a second PUSCH.

It should be understood that the first data channel and the second data channel need to be data channels of a same type, in other words, the first data channel and the second data channel are both PDSCHs or PUSCHs. When the first data channel and the second data channel are both PDSCHs, the transmit end device may be a network device. When the first data channel and the second data channel are both PUSCHs, the transmit end device is a terminal device.

With reference to the second aspect, in some possible designs, when the first data channel is the first physical downlink shared channel PDSCH, the first PDSCH is mapped to the first resource if a beam corresponding to the first PDSCH is the same as a first beam.

With reference to the second aspect, in some possible designs, when the first data channel is the first physical downlink shared channel PDSCH, the first PDSCH is not mapped to the first resource if the beam corresponding to the first PDSCH is different from the first beam.

In the foregoing solution, whether the first PDSCH is mapped to the first resource is determined based on whether the beam corresponding to the first PDSCH is the same as the first beam. This can avoid frequent beam switching, help the transmit end device and the receive end device have a consistent understanding on mapping of the PDSCH, avoid the unnecessary waste of resources, and improve the receiving performance.

With reference to the second aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the second aspect, in some possible designs, the first resource is before an end location of first duration, and that the first PDSCH is mapped to the first resource if a beam corresponding to the first PDSCH is the same as a first beam includes: the first PDSCH is mapped to the first resource if the beam corresponding to the first PDSCH is the same as the second beam; or the first PDSCH is not mapped to the first resource if the beam corresponding to the first PDSCH is different from the second beam, where the first duration is associated with processing time of a terminal device.

It should be understood that that the first duration is associated with processing time of a terminal device may be understood as that the terminal device determines the first duration. Specifically, the first duration is a sum of time used by the terminal device to process the first indication information and time used to perform beam switching, or the first duration is time used by the terminal device from receiving the first indication information to completing the beam switching.

With reference to the second aspect, in some possible designs, the first resource is after an end location of first duration, and that the first PDSCH is mapped to the first resource if a beam corresponding to the first PDSCH is the same as a first beam includes: the first PDSCH is mapped to the first resource if the first PDSCH has a high priority and the beam corresponding to the first PDSCH is the same as the third beam; or the first PDSCH is not mapped to the first resource if the first PDSCH has a high priority and the beam corresponding to the first PDSCH is different from the third beam, where the first duration is associated with processing time of a terminal device.

With reference to the second aspect, in some possible designs, second indication information is obtained, where the second indication information indicates that the beam corresponding to the first PDSCH is different from a beam corresponding to a third PDSCH, and the third PDSCH is before the first PDSCH.

For beneficial effects brought by the foregoing resource mapping method, refer to the specific descriptions of the first aspect. For brevity, details are not described one by one again.

According to a third aspect, a resource mapping method is provided. The method may be performed by a network device, or may be performed by a chip configured in the network device. The method includes: mapping a first physical downlink shared channel PDSCH to a first resource if a beam corresponding to the first PDSCH is the same as a first beam; and sending a signal on the first PDSCH; or skipping mapping a first PDSCH to a first resource if a beam corresponding to the first PDSCH is different from a first beam.

In the foregoing solution, whether to map the first PDSCH to the first resource is determined based on whether the beam corresponding to the first PDSCH is the same as the first beam. This can avoid frequent beam switching, help a transmit end device and a receive end device have a consistent understanding on mapping of the PDSCH, avoid an unnecessary waste of resources, and improve receiving performance.

With reference to the third aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the third aspect, in some possible designs, the first resource is before an end location of first duration, and the mapping a first physical downlink shared channel PDSCH to a first resource if a beam corresponding to the first PDSCH is the same as a first beam includes: mapping the first PDSCH to the first resource if the beam corresponding to the first PDSCH is the same as the second beam; or skipping mapping the first PDSCH to the first resource if the beam corresponding to the first PDSCH is different from the second beam, where the first duration is associated with processing time of a terminal device.

It should be understood that that the first duration is associated with processing time of a terminal device may be understood as that the terminal device determines the first duration. Specifically, the first duration is a sum of time used by the terminal device to process the first indication information and time used to perform beam switching, or the first duration is time used by the terminal device from receiving the first indication information to completing the beam switching.

In the foregoing solution, for symbols to be mapped to before the end location of the first duration, the beam corresponding to the first PDSCH is compared with the second beam. When the beam corresponding to the first PDSCH and the second beam are the same, the first PDSCH is mapped to the first resource. Otherwise, the first PDSCH is not mapped to the first resource. This can avoid frequent beam switching, help the transmit end device and the receive end device have a consistent understanding on the mapping of the PDSCH, avoid the unnecessary waste of resources, and improve the receiving performance.

With reference to the third aspect, in some possible designs, the first resource is after an end location of first duration, and the mapping a first physical downlink shared channel PDSCH to a first resource if a beam corresponding to the first PDSCH is the same as a first beam includes: mapping the first PDSCH to the first resource if the first PDSCH has a high priority and the beam corresponding to the first PDSCH is the same as the third beam; or skipping mapping the first PDSCH to the first resource if the first PDSCH has a high priority and the beam corresponding to the first PDSCH is different from the third beam, where the first duration is associated with processing time of a terminal device.

In the foregoing solution, for symbols to be mapped to after the end location of the first duration, the beam corresponding to the high-priority first PDSCH is compared with the third beam. When the beam corresponding to the high-priority first PDSCH and the third beam are the same, the first PDSCH is mapped to the first resource. Otherwise, the first PDSCH is not mapped to the first resource. This can accurately and efficiently receive a message of an emergency service, and improve transmission efficiency. In addition, this can avoid frequent beam switching, help the transmit end device and the receive end device have a consistent understanding on the mapping of the PDSCH, avoid the unnecessary waste of resources, and improve the receiving performance.

With reference to the third aspect, in some possible designs, second indication information is obtained, where the second indication information indicates that the beam corresponding to the first PDSCH is different from a beam corresponding to a second PDSCH, and the second PDSCH is before the first PDSCH.

In the foregoing solution, that second indication information is obtained may be that higher layer signaling or a physical layer configures the second indication information. After receiving the second indication information, the transmit end device learns that the beam corresponding to the first PDSCH is different from a beam corresponding to a PDSCH (a third PDSCH) scheduled at a previous moment, and needs to further determine whether the first PDSCH is the same as the first beam. This can avoid frequent beam switching, help the transmit end device and the receive end device have a consistent understanding on the mapping of the PDSCH, avoid the unnecessary waste of resources, and improve the receiving performance.

According to a fourth aspect, a resource mapping method is provided. The method may be performed by a terminal device, or may be performed by a chip configured in the terminal device. The method includes: receiving a signal of a first physical downlink shared channel PDSCH, where the first PDSCH is mapped to a first resource if a beam corresponding to the first PDSCH is the same as a first beam; or the first PDSCH is not mapped to a first resource if a beam corresponding to the first PDSCH is different from a first beam; and processing the received signal.

In the foregoing solution, whether the first PDSCH is mapped to the first resource is determined based on whether the beam corresponding to the first PDSCH is the same as the first beam. This can avoid frequent beam switching, help a transmit end device and a receive end device have a consistent understanding on mapping of the PDSCH, avoid an unnecessary waste of resources, and improve receiving performance.

With reference to the fourth aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the fourth aspect, in some possible designs, the first resource is before an end location of first duration, and that the first PDSCH is mapped to a first resource if a beam corresponding to the first PDSCH is the same as a first beam includes: the first PDSCH is mapped to the first resource if the beam corresponding to the first PDSCH is the same as the second beam; or the first PDSCH is not mapped to the first resource if the beam corresponding to the first PDSCH is different from the second beam, where the first duration is associated with processing time of the terminal device.

It should be understood that that the first duration is associated with processing time of the terminal device may be understood as that the terminal device determines the first duration. Specifically, the first duration is a sum of time used by the terminal device to process the first indication information and time used to perform beam switching, or the first duration is time used by the terminal device from receiving the first indication information to completing the beam switching.

With reference to the fourth aspect, in some possible designs, the first resource is after an end location of first duration, and that the first PDSCH is mapped to first symbols to be mapped to if a beam corresponding to the first PDSCH is the same as a first beam includes: the first PDSCH is mapped to the first resource if the first PDSCH has a high priority and the beam corresponding to the first PDSCH is the same as the third beam; or the first PDSCH is not mapped to the first resource if the first PDSCH has a high priority and the beam corresponding to the first PDSCH is different from the third beam, where the first duration is associated with processing time of the terminal device.

With reference to the fourth aspect, in some possible designs, second indication information is obtained, where the second indication information indicates that the beam corresponding to the first PDSCH is different from a beam corresponding to a second PDSCH, and the second PDSCH is before the first PDSCH.

For beneficial effects brought by the foregoing resource mapping method, refer to the specific descriptions of the third aspect. For brevity, details are not described one by one again.

According to a fifth aspect, a resource mapping apparatus is provided. The apparatus includes: a processing module, configured to: map a first data channel to a symbol other than at least one first symbol in a first resource, and/or map a second data channel to a symbol other than at least one first symbol in a second resource, where a beam corresponding to the first data channel is different from a beam corresponding to the second data channel, M second symbols are included between the first resource and the second resource, the second symbol is a symbol to which the first data channel and the second data channel are not mapped, the first symbol is adjacent to the second symbol, M is an integer and M≥0, and a sum of a quantity of first symbols and a quantity of second symbols is equal to a first threshold; and a transceiver module, configured to send signals on the first data channel and the second data channel.

With reference to the fifth aspect, in some possible designs, the processing module is further configured to map a reference signal to an $N^{th}$ symbol after a third symbol, where the $N^{th}$ symbol is determined based on a location of a symbol to which the reference signal is to be mapped, the third symbol includes the first symbol and the second symbol, and N is a positive integer greater than or equal to 1; and the transceiver module is further configured to send the reference signal.

With reference to the fifth aspect, in some possible designs, the symbol to which the reference signal is to be mapped overlaps the third symbol; or there is no symbol, in the second resource, to which the reference signal is to be mapped, where the second resource is after the first resource.

With reference to the fifth aspect, in some possible designs, the processing module is further configured to skip mapping a first signal to the third symbol, where a symbol to which the first signal is to be mapped overlaps the third symbol, and the first signal includes a control resource set.

With reference to the fifth aspect, in some possible designs, switching from the beam corresponding to the first data channel to the beam corresponding to the second data channel is started at a beam switching location, where the beam switching location is before the third symbol.

With reference to the fifth aspect, in some possible designs, the first resource is determined based on first resource indication information, the second resource is determined based on second resource indication information, the first resource indication resource information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

With reference to the fifth aspect, in some possible designs, the first data channel is a first physical downlink shared channel PDSCH, and the second data channel is a second PDSCH; or the first data channel is a first physical uplink shared channel PUSCH, and the second data channel is a second PUSCH.

With reference to the fifth aspect, in some possible designs, when the first data channel is the first physical downlink shared channel PDSCH, the processing module is further configured to map the first PDSCH to the first resource, where a beam corresponding to the first PDSCH is the same as a first beam.

With reference to the fifth aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the fifth aspect, in some possible designs, the first resource is before an end location of first duration, and the processing module is specifically configured to map the first PDSCH to the first resource, where the beam corresponding to the first PDSCH is the same as the second beam, where the first duration is associated with processing time of a terminal device.

With reference to the fifth aspect, in some possible designs, the first resource is after an end location of first duration, and the processing module is specifically configured to map the first PDSCH to the first resource, where the first PDSCH has a high priority, and the beam corresponding to the first PDSCH is the same as the third beam, where the first duration is associated with processing time of a terminal device.

With reference to the fifth aspect, in some possible designs, the processing module is further configured to obtain second indication information, where the second indication information indicates that the beam corresponding to the first PDSCH is different from a beam corresponding to a third PDSCH, and the third PDSCH is before the first PDSCH.

According to a sixth aspect, a resource mapping apparatus is provided. The apparatus includes: a transceiver module, configured to receive signals of a first data channel and a second data channel, where a beam corresponding to the first data channel is different from a beam corresponding to the second data channel, the first data channel is mapped to a symbol other than at least one second symbol in a first resource and/or the second data channel is mapped to a symbol other than at least one second symbol in a second resource, M first symbols are included between the first resource and the second resource, the first symbol is a symbol to which the first data channel and the second data channel are not mapped, the first symbol is adjacent to the second symbol, M is an integer and M≥0, and a sum of a quantity of second symbols and a quantity of first symbols is equal to a first threshold; and a processing module, configured to process the received signals.

With reference to the sixth aspect, in some possible designs, the transceiver module is further configured to receive a reference signal, where the reference signal is mapped to an $N^{th}$ symbol after a third symbol, the $N^{th}$ symbol is determined based on a location of a symbol to which the reference signal is to be mapped, the third symbol includes the first symbol and the second symbol, and N is a positive integer greater than or equal to 1; and the processing module is further configured to process the received reference signal.

With reference to the sixth aspect, in some possible designs, the symbol to which the reference signal is to be mapped overlaps the third symbol; or there is no symbol, in the second resource, to which the reference signal is to be mapped, where the second resource is after the first resource.

With reference to the sixth aspect, in some possible designs, the processing module is further configured to determine that a first signal is not mapped to the third symbol, where the first signal includes a control resource set, and a symbol to which the first signal is to be mapped overlaps the third symbol.

With reference to the sixth aspect, in some possible designs, the processing module is further configured to start to switch from the beam corresponding to the first data channel to the beam corresponding to the second data channel at a beam switching location, where the beam switching location is before the third symbol.

With reference to the sixth aspect, in some possible designs, the first resource is determined based on first resource indication information, the second resource is determined based on second resource indication information, the first resource indication resource information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

With reference to the sixth aspect, in some possible designs, the first data channel is a first physical downlink shared channel PDSCH, and the second data channel is a second PDSCH; or the first data channel is a first physical uplink shared channel PUSCH, and the second data channel is a second PUSCH.

With reference to the sixth aspect, in some possible designs, when the first data channel is the first physical downlink shared channel PDSCH, the processing module is further configured to determine that the first PDSCH is mapped to the first resource, where a beam corresponding to the first PDSCH is the same as a first beam.

With reference to the sixth aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the sixth aspect, in some possible designs, the first resource is before an end location of first duration, and the processing module is specifically configured to determine that the first PDSCH is mapped to the first resource, where the beam corresponding to the first PDSCH is the same as the second beam, where the first duration is associated with processing time of a terminal device.

With reference to the sixth aspect, in some possible designs, the first resource is after an end location of first duration, and the processing module is specifically configured to determine that the first PDSCH is mapped to the first resource, where the first PDSCH has a high priority, and the beam corresponding to the first PDSCH is the same as the third beam, where the first duration is associated with processing time of a terminal device.

With reference to the sixth aspect, in some possible designs, the processing module is further configured to obtain second indication information, where the second indication information indicates that the beam corresponding to the first PDSCH is different from a beam corresponding to a third PDSCH, and the third PDSCH is before the first PDSCH.

According to a seventh aspect, a resource mapping apparatus is provided. The apparatus includes: a processing module, configured to map a first physical downlink shared channel PDSCH to a first resource if a beam corresponding to the first PDSCH is the same as a first beam; and a transceiver module, configured to send a signal on the first PDSCH; or a processing module, configured to skip mapping a first PDSCH to a first resource if a beam corresponding to the first PDSCH is different from a first beam.

With reference to the seventh aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the seventh aspect, in some possible designs, the first resource is before an end location of first duration, and the processing module is specifically configured to: map the first PDSCH to the first resource if the beam corresponding to the first PDSCH is the same as the second beam; or skip mapping the first PDSCH to the first resource if the beam corresponding to the first PDSCH is different from the second beam, where the first duration is associated with processing time of a terminal device.

With reference to the seventh aspect, in some possible designs, the first resource is after an end location of first duration, and the processing module is specifically configured to: map the first PDSCH to the first resource if the first PDSCH has a high priority and the beam corresponding to the first PDSCH is the same as the third beam; or skip mapping the first PDSCH to the first resource if the first PDSCH has a high priority and the beam corresponding to the first PDSCH is different from the third beam, where the first duration is associated with processing time of a terminal device.

With reference to the seventh aspect, in some possible designs, the processing module is further configured to obtain second indication information, where the second indication information indicates that the beam corresponding to the first PDSCH is different from a beam corresponding to a second PDSCH, and the second PDSCH is before the first PDSCH.

According to an eighth aspect, a resource mapping apparatus is provided. The apparatus includes: a transceiver module, configured to receive a signal of a first physical downlink shared channel PDSCH, where the first PDSCH is mapped to a first resource if a beam corresponding to the first PDSCH is the same as a first beam; or the first PDSCH is not mapped to a first resource if a beam corresponding to the first PDSCH is different from a first beam; and a processing module, configured to process the received signal.

With reference to the eighth aspect, in some possible designs, the first beam is a second beam or a third beam, the second beam is a beam corresponding to first indication information or a preconfigured beam, and the third beam is a beam corresponding to the first indication information, a beam indicated by the first indication information, or a preconfigured beam.

With reference to the eighth aspect, in some possible designs, the first resource is before an end location of first duration, and the processing module is specifically configured to: determine that the first PDSCH is mapped to the first resource if the beam corresponding to the first PDSCH is the same as the second beam; or determine that the first PDSCH is not mapped to the first resource if the beam corresponding to the first PDSCH is different from the second beam, where the first duration is associated with processing time of a terminal device.

With reference to the eighth aspect, in some possible designs, the first resource is after an end location of first duration, and the processing module is specifically configured to: determine that the first PDSCH is mapped to the first resource if the first PDSCH has a high priority and the beam corresponding to the first PDSCH is the same as the third beam; or determine that the first PDSCH is not mapped to the first resource if the first PDSCH has a high priority and the beam corresponding to the first PDSCH is different from the third beam, where the first duration is associated with processing time of a terminal device.

With reference to the eighth aspect, in some possible designs, the processing module is further configured to obtain second indication information, where the second indication information indicates that the beam corresponding to the first PDSCH is different from a beam corresponding to a second PDSCH, and the second PDSCH is before the first PDSCH.

According to a ninth aspect, a communication device is provided. The device includes at least one processor, and the at least one processor is coupled to at least one memory. The at least one memory is configured to store a computer program or instructions, and the at least one processor is configured to invoke the computer program or the instructions from the at least one memory and run the computer program or the instructions, so that the communication device is enabled to perform the method in any possible implementation of the first aspect.

According to a tenth aspect, a communication device is provided. The device includes at least one processor, and the at least one processor is coupled to at least one memory. The at least one memory is configured to store a computer program or instructions, and the at least one processor is configured to invoke the computer program or the instructions from the at least one memory and run the computer program or the instructions, so that the communication device is enabled to perform the method in any possible implementation of the second aspect.

According to an eleventh aspect, a communication device is provided. The device includes at least one processor, and the at least one processor is coupled to at least one memory. The at least one memory is configured to store a computer program or instructions, and the at least one processor is configured to invoke the computer program or the instructions from the at least one memory and run the computer program or the instructions, so that the communication device is enabled to perform the method in any possible implementation of the third aspect.

According to a twelfth aspect, a communication device is provided. The device includes at least one processor, and the at least one processor is coupled to at least one memory. The at least one memory is configured to store a computer program or instructions, and the at least one processor is configured to invoke the computer program or the instructions from the at least one memory and run the computer program or the instructions, so that the communication device is enabled to perform the method in any possible implementation of the fourth aspect.

According to a thirteenth aspect, this application provides a computer-readable storage medium. The computer-readable storage medium stores computer instructions. When the computer instructions are run on a computer, the method according to any one of the first aspect or the possible implementations of the first aspect is performed.

According to a fourteenth aspect, this application provides a computer-readable storage medium. The computer-readable storage medium stores computer instructions. When the computer instructions are run on a computer, the method according to any one of the second aspect or the possible implementations of the second aspect is performed.

According to a fifteenth aspect, this application provides a computer-readable storage medium. The computer-readable storage medium stores computer instructions. When the computer instructions are run on a computer, the method according to any one of the third aspect or the possible implementations of the third aspect is performed.

According to a sixteenth aspect, this application provides a computer-readable storage medium. The computer-readable storage medium stores computer instructions. When the computer instructions are run on a computer, the method according to any one of the fourth aspect or the possible implementations of the fourth aspect is performed.

According to a seventeenth aspect, this application provides a computer program product. The computer program product includes computer program code. When the computer program code is run on a computer, the method according to any one of the first aspect or the possible implementations of the first aspect is performed.

According to an eighteenth aspect, this application provides a computer program product. The computer program product includes computer program code. When the computer program code is run on a computer, the method according to any one of the second aspect or the possible implementations of the second aspect is performed.

According to a nineteenth aspect, this application provides a computer program product. The computer program product includes computer program code. When the computer program code is run on a computer, the method according to any one of the third aspect or the possible implementations of the third aspect is performed.

According to a twentieth aspect, this application provides a computer program product. The computer program product includes computer program code. When the computer program code is run on a computer, the method according to any one of the fourth aspect or the possible implementations of the fourth aspect is performed.

According to a twenty-first aspect, this application provides a chip, including a processor and a communication interface. The communication interface is configured to: receive a signal, and transmit the signal to the processor, and the processor processes the signal, so that the method according to any one of the first aspect or the possible implementations of the first aspect is performed.

According to a twenty-second aspect, this application provides a chip, including a processor and a communication interface. The communication interface is configured to: receive a signal, and transmit the signal to the processor, and the processor processes the signal, so that the method according to any one of the second aspect or the possible implementations of the second aspect is performed.

According to a twenty-third aspect, this application provides a chip, including a processor and a communication interface. The communication interface is configured to: receive a signal, and transmit the signal to the processor, and the processor processes the signal, so that the method according to any one of the third aspect or the possible implementations of the third aspect is performed.

According to a twenty-fourth aspect, this application provides a chip, including a processor and a communication interface. The communication interface is configured to: receive a signal, and transmit the signal to the processor, and the processor processes the signal, so that the method according to any one of the fourth aspect or the possible implementations of the fourth aspect is performed.

According to a twenty-fifth aspect, this application provides a communication system, including the communication device according to the ninth aspect and the communication device according to the tenth aspect.

According to a twenty-sixth aspect, this application provides a communication system, including the communication device according to the eleventh aspect and the communication device according to the twelfth aspect.

DESCRIPTION OF EMBODIMENTS

The following describes technical solutions of this application with reference to accompanying drawings.

Figure 1:
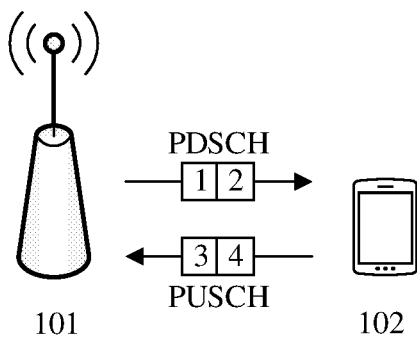
FIG. 1 shows an example of a system architecture to which an embodiment of this application is applicable.

FIG. 1 is a schematic diagram of a wireless communication system 100 applicable to an embodiment of this application. As shown in FIG. 1, the wireless communication system 100 may include at least one network device 101, and the network device 101 performs wireless communication with at least one terminal device (for example, a terminal device 102 shown in FIG. 1). The network device 101 schedules a PDSCH or a PUSCH in a plurality of time units for the terminal device. The PDSCH shown in FIG. 1 occupies a plurality of time units (for example, a time unit 1 and a time unit 2 shown in FIG. 1), and the PUSCH also occupies a plurality of time units (for example, a time unit 3 and a time unit 4 shown in FIG. 1).

It should be understood that FIG. 1 is merely an example for description. One PDSCH may occupy a plurality of time units. Alternatively, one PDSCH occupies one time unit, and each time unit corresponds to a different PDSCH. Alternatively, PDSCHs in any two or more time units are different in a plurality of time units. This is also true for the PUSCH, and details are not described in embodiments of this application.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or an NR system.

A terminal device in embodiments of this application may be user equipment, an access terminal, a subscriber unit, a subscriber station, a mobile station (MS), a remote station, a remote terminal, a mobile device, a user terminal, a terminal, a wireless communication device, a user agent, or a user apparatus. The terminal device may alternatively be a cellular phone, a smartphone, a wireless data card, a cordless phone, a session initiation protocol (SIP) phone, a wireless local loop (WLL) station, a personal digital assistant (PDA), a tablet computer, a laptop computer, a handheld device (handset) with a wireless communication function, a computing device or another processing device connected to a wireless modem, a vehicle-mounted device, a wearable device, a terminal device in a 5G network, a terminal device in a public land mobile network (PLMN), a terminal device in machine type communication (MTC), a vehicle-mounted communication apparatus, a vehicle-mounted communication chip, a roadside unit or a communication apparatus in the roadside unit, a device used in an industrial scenario, or the like. This is not limited in embodiments of this application.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

A network device in embodiments of this application may be a device configured to communicate with a terminal device, and may be any device having a transceiver function. The network device may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

In addition, in embodiments of this application, the network device may be a device in a RAN, in other words, may be a RAN node that connects the terminal device to a wireless network. For example, by way of example, and not limitation, as a base station, the network device may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), or a baseband unit (BBU). In a network structure, the network device may include a central unit (CU) node or a distributed unit (DU) node, a RAN device including a CU node and a DU node, or a RAN device including a CU control plane node (CU-CP node), a CU user plane node (CU-UP node), and a DU node.

The network device provides a service for a cell. The terminal device communicates with the base station on a transmission resource (for example, a frequency domain resource, in other words, a frequency spectrum resource) used for the cell. The cell may be a cell corresponding to the base station (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are applicable to providing a high-speed data transmission service.

For ease of understanding embodiments of this application, concepts in embodiments of this application are first described below.

In NR, a beam is introduced into a communication system. The beam is a communication resource, and may also be referred to as a spatial domain filter (SDF), a transmission state indication (TCI), or the like.

Beams may be classified into transmit beams and receive beams. A technology for forming the beam may be a beamforming technology or another technology. Beamforming includes transmit beamforming and receive beamforming.

Optionally, a plurality of beams having a same communication feature or similar communication features may be considered as one beam. One beam may include one or more antenna ports, configured to transmit a data channel, a control channel, a sounding signal, and the like.

The transmit beam may refer to signal strength distribution formed in different directions in space after a signal is transmitted through an antenna. A transmit end sends a signal with a specific beamforming weight, so that the sent signal forms a beam with spatial directivity. In an uplink direction, the transmit end may be a terminal device. In a downlink direction, the transmit end may be a network device.

The receive beam may refer to distribution of strengthening or weakening reception of a radio signal in different directions in space by an antenna array. A receive end receives a signal with a specific beamforming weight, so that the received signal forms a beam with spatial directivity. In an uplink direction, the receive end may be a network device. In a downlink direction, the receive end may be a terminal device.

Transmit beamforming: When a transmit end device with an antenna array sends a signal, a specific amplitude and phase are set on each antenna element of the antenna array, so that the sent signal has specific spatial directivity, that is, the signal has high signal power in some directions, and has low signal power in some other directions. A direction with highest signal power is a direction of a transmit beam. The antenna array includes a plurality of antenna elements. The additional specific amplitude and phase are a beamforming weight.

Receive beamforming: When a receive end device with an antenna array receives a signal, a specific amplitude and phase are set on each antenna element of the antenna array, so that a power gain of the received signal is directional, that is, the power gain is high when the signal is received in some directions, and the power gain is low when the signal is received in some other directions. A direction with a highest power gain when the signal is received is a direction of a receive beam. The antenna array includes a plurality of antenna elements. The additional specific amplitude and phase are a beamforming weight.

Sending a signal by using a transmit beam is sending the signal by using a beamforming weight.

Receiving a signal by using a receive beam is receiving the signal by using a beamforming weight.

Different beams may be considered as different resources, and same information or different information may be sent by using (through) different beams.

Quasi co-location (QCL): If a feature of a channel over which a symbol on one antenna port is transmitted can be inferred from a channel over which a symbol on another antenna port is transmitted, the two antenna ports are referred to as having a QCL relationship. In an NR protocol, the QCL relationship may be classified into the following four types based on different parameters:

type A (type A): a Doppler shift, a Doppler spread, an average delay, and a delay spread;

type B (type B): the Doppler shift and the Doppler spread;

type C (type C): the Doppler shift and the average delay; and type D (type D): a spatial receive parameter.

In this application, a terminal device may learn of a required beam direction based on the QCL relationship. The QCL in embodiments of this application is a QCL of the type D, that is, a receiving relationship. Unless otherwise specified in the following, the QCL may be understood as the QCL of the type D, namely, a QCL defined based on the spatial receive parameter. Specifically, two signals of a same beam have a QCL relationship for the spatial receive parameter (spatial Rx parameter), namely, QCL-Type D: {Spatial Rx parameter} in an existing protocol.

The QCL of the type D may alternatively be understood from two perspectives: a transmit end and a receive end. From a perspective of the transmit end, if two antenna ports are spatially QCLed, it may mean that corresponding beam directions of the two antenna ports are consistent in space. From a perspective of the receive end, if two antenna ports are spatially QCLed, it may mean that the receive end can receive, in a same beam direction, signals sent through the two antenna ports.

Signals transmitted on ports having a spatial QCL relationship may further have corresponding beams, and the corresponding beams include at least one of the following: a same receive beam, a same transmit beam, a transmit beam corresponding to a receive beam, and a receive beam corresponding to a transmit beam.

Signals transmitted on ports having a spatial QCL relationship may alternatively be understood as signals received or sent by using a same spatial filter. The spatial filter may be at least one of the following: precoding, a weight of an antenna port, a phase deflection of the antenna port, or an amplitude gain of the antenna port.

Signals transmitted on ports having a spatial QCL relationship may alternatively be understood as having corresponding beam pair links (BPLs), and the corresponding BPLs include at least one of the following: a same downlink BPL, a same uplink BPL, an uplink BPL corresponding to a downlink BPL, and a downlink BPL corresponding to an uplink BPL.

Therefore, the spatial receive parameter (namely, the QCL of the type D) may be understood as a parameter indicating direction information of a receive beam.

Transmission configuration indicator (TCI): In this application, the TCI may be used to indicate and determine beam directions (including a receive beam direction and a transmit beam direction) used by the terminal device. For example, if a TCI corresponding to a PDCCH in a slot 1 is equal to 1, it may indicate that a receive beam direction of the terminal device has a QCL relationship of the type D with a reference signal 1. If DCI carried on the PDCCH in the slot 1 indicates that a TCI of a PDSCH scheduled by the DCI in a slot 3 is equal to 3, it may indicate that a receive beam direction of the terminal device for the PDSCH has a QCL relationship of the type D with a reference signal 2. The TCI may be indicated by using radio resource control (RRC) signaling, medium access control (MAC) signaling, or DCI signaling. Effective time of the RRC is greater than that of the MAC, and the effective time of the MAC is greater than that of the DCI. For example, the effective time of the RRC signaling is at a 10-millisecond level, the effective time of the MAC signaling is at a millisecond level, and the effective time of the DCI signaling is less than 1 millisecond.

The beam in embodiments of this application may also be referred to as a beam configuration or a beam direction. The beam direction may be understood as a spatial domain filter, a TCI, or a QCL. Different beam directions may be understood as using different spatial domain filters, or using different QCL assumptions, or using different TCI configurations. This is not limited in this application.

QCL duration (timeDurationForQCL) refers to a minimum quantity of OFDM symbols required by the terminal device to perform PDCCH reception and apply spatial QCL information received in DCI to PDSCH processing. The terminal device indicates a value of a minimum quantity of OFDM symbols for each subcarrier spacing.

When the DCI schedules a PDSCH, it is assumed that the DCI also indicates a TCI status corresponding to the PDSCH. In this case, after detecting the DCI, the terminal device can switch, only after a time period with a length of the QCL duration elapses, a beam of the terminal device from another beam direction to a beam direction corresponding to the TCI indicated by the DCI. This is because in this time period, the terminal device has not completed decoding on the DCI, and does not know where the PDSCH scheduled by the DCI starts. Therefore, in this time period, the terminal device needs to receive and buffer various signals in a default beam direction. After the terminal device completes decoding on the DCI, if the terminal device finds that the beam direction corresponding to the TCI indicated by the DCI is different from a current beam direction, the terminal device further needs to take time to complete beam switching. Therefore, the QCL duration refers to DCI processing time and beam switching time. After these processes are completed, the terminal device can receive the PDSCH in the beam direction corresponding to the TCI indicated by the DCI.

In consideration of different service requirements, NR may support both slot-based scheduling and non-slot-based scheduling, and dedicated time domain resource allocation information bits in NR DCI indicate different time domain configuration information for a PDSCH and a PUSCH. The information includes time domain offset values, time domain start symbols S, and quantities L of time domain symbols.

For example, K0 and K2 may be used as time domain offset values. K0 is a time unit interval between downlink scheduling DCI and a PDSCH scheduled by the downlink scheduling DCI, and K2 is a time unit interval between uplink scheduling DCI and a PUSCH scheduled by the uplink scheduling DCI.

Subcarrier spacing (SCS): Usually, if the SCS is larger, a time unit corresponding to the SCS is shorter. An example in which the time unit is a slot is used for description. For example, when the SCS is 15 kHz, a length of one slot is 1 millisecond, and there are 14 symbols in 1 millisecond. If the SCS is 60 kHz, there are 14*4 symbols in 1 millisecond, that is, 56 symbols. In this case, a slot length is ¼ milliseconds, that is, 0.25 milliseconds.

When the SCS is small, each symbol corresponds to relatively long time. When the terminal device and a network device expect to switch a beam direction, switching duration is shorter than time corresponding to a single symbol. Therefore, if switching occurs, the symbol is not occupied. In addition, a length of the QCL duration does not exceed two slots, or even shorter than one slot.

However, when the SCS is large, for example, greater than or equal to 480 kHz, time corresponding to a symbol is short, and the time corresponding to the symbol is shorter than beam switching duration. As a result, the entire symbol is occupied. In a beam switching process, the occupied symbol cannot be used for PDSCH or PUSCH transmission. When a PDSCH or a PUSCH is consecutively scheduled in a plurality of time units, the terminal device and a network device may have inconsistent understandings on resource mapping of the PDSCH or the PUSCH. To be specific, the terminal device considers that the PDSCH or the PUSCH is consecutively sent in the plurality of time units. However, in the beam switching process, a part of PDSCHs or PUSCHs cannot be sent due to an occupied symbol. Therefore, the resource mapping of the PDSCH or the PUSCH is discontinuous.

Therefore, this application provides a resource mapping method, to improve receiving performance of a terminal device and a network device.

Figure 2:
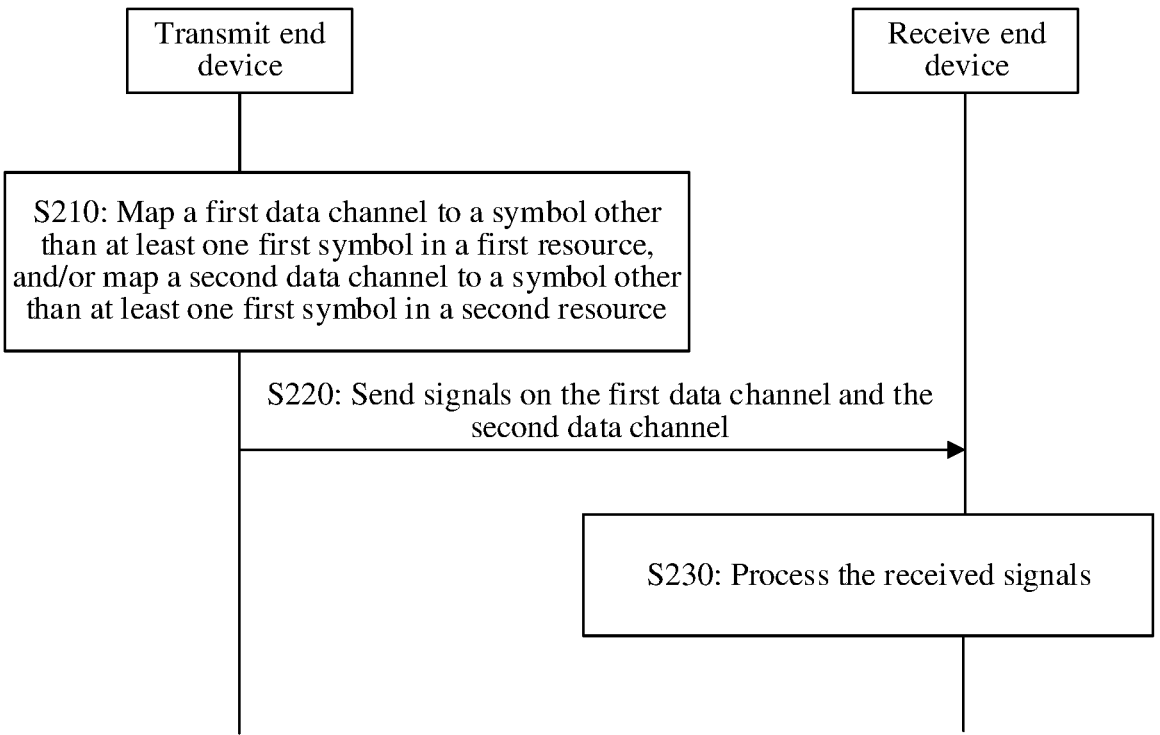
FIG. 2 is a schematic flowchart of a resource mapping method 500 according to an embodiment of this application.

FIG. 2 is a schematic flowchart of a resource mapping method according to this application. As shown in FIG. 2, the method may include steps S210 to S230. The following describes each step in detail.

S210: A transmit end device maps a first data channel to a symbol other than at least one first symbol in a first resource, and/or maps a second data channel to a symbol other than at least one first symbol in a second resource.

S220: The transmit end device sends signals on the first data channel and the second data channel.

S230: A receive end device processes the received signals.

Specifically, the first data channel is mapped to the symbol other than the at least one second symbol in the first resource, and/or the second data channel is mapped to the symbol other than the at least one first symbol in the second resource. A beam corresponding to the first data channel is different from a beam corresponding to the second data channel, M second symbols are included between the first resource and the second resource, the second symbol is a symbol to which the first data channel and/or the second data channel are/is not mapped, the first symbol is adjacent to the second symbol, M is an integer and M≥0, and a sum of a quantity of first symbols and a quantity of second symbols is equal to a first threshold. For example, the second symbol may be a symbol to which a resource, for example, a control resource set (CORESET), other than the first data channel and the second data channel is mapped.

The first data channel and the second data channel may be data channels of a same type. For example, the first data channel is a PDSCH, and the second data channel is also a PDSCH; the first data channel is a PUSCH, and the second data channel is also a PUSCH.

For example, when the data channel is a PDSCH, the transmit end device may be a network device, and the receive end device may be a terminal device; when the data channel is a PUSCH, the transmit end device may be a terminal device, and the receive end device may be a network device.

This embodiment of this application may be applied to scheduling of a data channel in a plurality of time units.

For example, the time unit may be a symbol, a mini-slot, a slot, or a subframe. This is not limited in the method provided in this application. However, in this embodiment of this application, that the time unit is a slot is used for description. For an implementation process in another time unit, refer to the descriptions in this embodiment of this application.

A sending device may map a data channel to a time-frequency resource, to send data to a receiving device. In this embodiment of this application, an example in which the data channel is mapped in time domain is used for description.

When sending a signal on a data channel, the sending device first determines a spatial domain in which the signal is transmitted. In other words, the sending device determines a beam direction corresponding to the signal sent by the sending device on the data channel. The beam direction may alternatively be understood as a spatial domain filter, a QCL assumption, a TCI status, or the like.

In this embodiment of this application, the beam corresponding to the first data channel is different from the beam corresponding to the second data channel. The beam corresponding to the first data channel is a beam used to map the first data channel or send the first data channel, and the beam corresponding to the second data channel is also a beam used to map the second data channel or send the first data channel.

For example, the first data channel corresponds to a beam #1, and the second data channel corresponds to a beam #2. If the beam #1 is different from the beam #2, it is considered that the beam corresponding to the first data channel is different from the beam corresponding to the second data channel. If the beam #1 is the same as the beam #2, it is considered that the beam corresponding to the first data channel is the same as the beam corresponding to the second data channel. Different beam directions may be understood as using different spatial filters, or using different beam widths, or using different beam configurations.

Whether the beam corresponding to the first data channel is the same as the beam corresponding to the second data channel may be determined based on whether default beams corresponding to the data channels are the same, or may be determined based on whether a beam used to send indication information is the same as a beam indicated by the indication information. The indication information indicates to schedule the first data channel and the second data channel, and the indication information includes but is not limited to DCI.

For example, the first data channel and the second data channel in this application are scheduled in time domain. In other words, from a time domain perspective, the first data channel is sent at a moment before the second data channel, or the first data channel is sent at a moment after the second data channel. In addition, the first data channel and the second data channel may be in a same time unit, or may be in different time units.

When the beam corresponding to the first data channel is different from the beam corresponding to the second data channel, beam switching may occur. Therefore, the quantity of second symbols needs to be determined. To be specific, the M second symbols are included between the first resource and the second resource, the second symbol is the symbol to which the first data channel and/or the second data channel are/is not mapped, or the second symbol is a symbol used for the beam switching, and M is an integer and $M \geq 0$.

For example, the first resource is determined based on first resource indication information corresponding to the first data channel, and the second resource is determined based on second resource indication information corresponding to the second data channel. The first resource may occupy a plurality of symbols.

Optionally, the resource indication information may be start and length indication information (start & length indication value, SLIV), or indication information of a start symbol S and an allocation length L. Alternatively, the resource indication information directly indicates specific symbols to which the data channel needs to be mapped.

In different implementations, the first resource and the second resource may be located in a same time unit, or may be located in different time units.

For example, the same time unit may be understood as a same slot. For example, the first resource is located on symbols 0 to 5 of a slot #1, and the second resource is located on symbols 8 to 12 of the slot #1.

That the M second symbols are included between the first resource and the second resource may alternatively be understood as that the second symbol is located between the first resource and the second resource, or the second symbol is located between the last symbol of the first resource and a start symbol of second symbols to be mapped to, or the second symbol is located after the first resource and before the second resource.

An example in which the first resource is first symbols to be mapped to and the second resource is second symbols to be mapped to is used below for description.

Figures 3, 4:
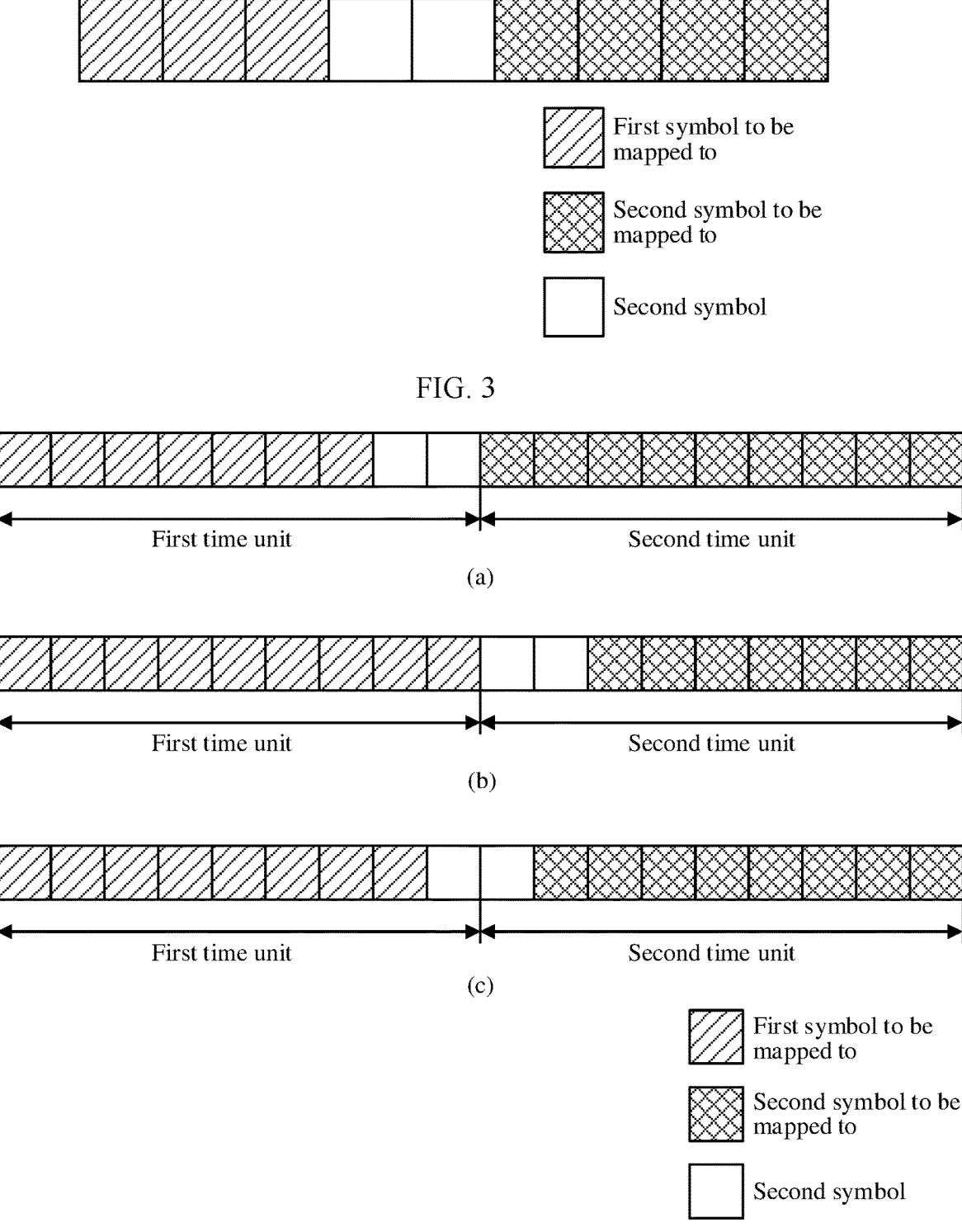
FIG. 3 is a schematic diagram of a location of a second symbol according to an embodiment of this application.
FIG. 4 is a schematic diagram of another location of a second symbol according to an embodiment of this application.

For example, as shown in FIG. 3, a total quantity of symbols scheduled by the transmit end device for the receive end device at a time is 9, where there are three first symbols to be mapped to, there are four second symbols to be mapped to, and two second symbols exist between the first symbols to be mapped to and the second symbols to be mapped to. Neither the first data channel nor the second data channel is mapped on the second symbol.

When the first symbols to be mapped to and the second symbols to be mapped to are located in two different time units, the quantity of first symbols is determined based on the two pieces of resource indication information. The second symbol may be located in one time unit, or may be located in the two time units.

For example, as shown in FIG. 4, the first symbols to be mapped to is located in a first time unit, the second symbols to be mapped to is located in a second time unit, the first time unit is before the second time unit, and each of the first time unit and the second time unit has nine symbols, where there are two second symbols. The second symbols may be located in the first time unit, in other words, a start symbol of the second symbols to be mapped to is the first symbol of the second time unit, as shown in (a) in FIG. 4. The second symbols may be located in the second time unit, in other words, the last symbol of the first symbols to be mapped to is the last symbol of the first time unit, as shown in (b) in FIG. 4. When the second symbols are located in both the first time unit and the second time unit, the last symbol of the first symbols to be mapped to is before the last symbol of the first time unit, and a start symbol of the second symbols to be mapped to is after the first symbol of the second time unit. As shown in (c) in FIG. 4, one second symbol is located in the first time unit, and one second symbol is located in the second time unit. (a) to (c) in FIG. 4 are examples. In another implementation, the second symbol may alternatively be distributed in another manner.

After determining the quantity of second symbols, the transmit end device compares the quantity of second symbols with the first threshold. If the quantity of second symbols is less than the first threshold, the transmit end device maps the first data channel to a symbol other than the at least one first symbol in the first symbols to be mapped to, and/or maps the second data channel to a symbol other than the at least one first symbol in the second symbols to be mapped to.

The sum of the quantity of first symbols and the quantity of second symbols is equal to the first threshold. In other words, the quantity of first symbols depends on the quantity of second symbols and the first threshold, and may be represented by using a formula, that is, the quantity T1 of first symbols=the first threshold−the quantity T2 of second symbols. As long as the quantity of first symbols is determined based on the quantity of second symbols and the first threshold, a corresponding implementation falls within the protection scope of embodiments of this application.

Optionally, the first threshold may be understood as time required for the beam switching, and a quantity of symbols corresponding to the time is the first threshold. The first threshold may be determined based on a capability of the terminal device, or may be directly defined in a protocol. For example, when an SCS is large, time corresponding to each symbol is short. For example, when the SCS is 960 kHz, the protocol may specify that the terminal device does not need to report capability information. For another example, the terminal device may directly notify the network device of a length of the time required for the beam switching or a quantity of symbols that may be affected.

Figure 5:
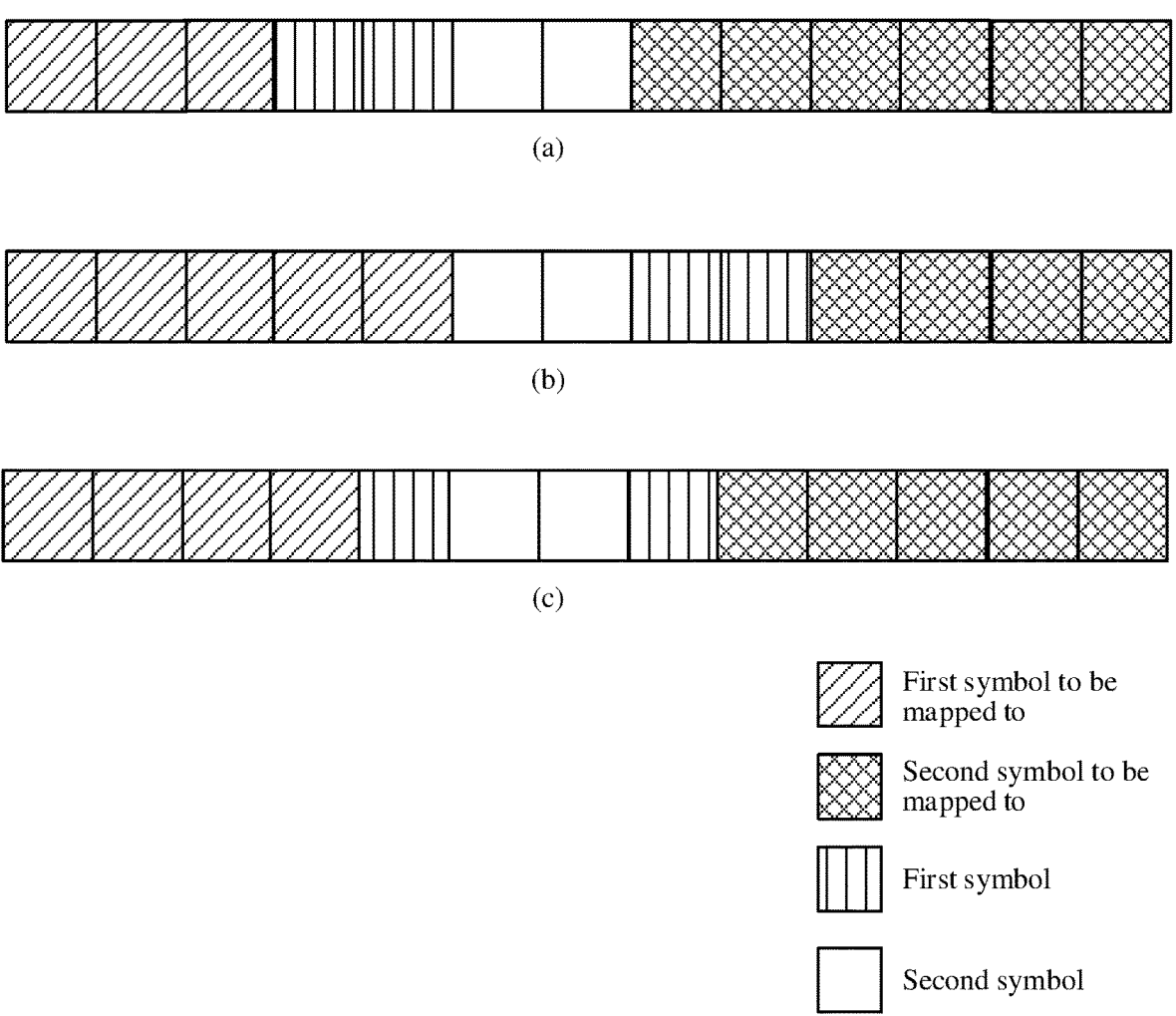
FIG. 5 is a schematic diagram of a location of a first symbol according to an embodiment of this application.

For example, four symbols are required for the beam switching, and the quantity of second symbols is 2. Therefore, two first symbols connected to the second symbols need to be selected from the first symbols to be mapped to, where the first data channel is not mapped to the first symbols, as shown in (a) in FIG. 5. Alternatively, two first symbols connected to the second symbols are selected from the second symbols to be mapped to, where the second data channel is not mapped to the first symbols, as shown in (b) in FIG. 5. Alternatively, one first symbol connected to the second symbols is selected from the first symbols to be mapped to, where the first data channel is not mapped to the first symbol, and one first symbol connected to the second symbols is selected from the second symbols to be mapped to, where the second data channel is not mapped to the first symbol, as shown in (c) in FIG. 5. A symbol to which a data channel needs to be mapped but is not mapped is referred to as a first symbol. The foregoing may also be described as follows: The first data channel is mapped to the symbol other than the at least one first symbol in the first symbols to be mapped to, and/or the second data channel is mapped to the symbol other than the at least one first symbol in the second symbols to be mapped to.

It should be noted that the quantity of second symbols may alternatively be 0, in other words, there is no symbol to which data is not mapped between the first symbols to be mapped to and the second symbols to be mapped to, or the last symbol of the first symbols to be mapped to is adjacent to a start symbol of the second symbols to be mapped to. In this case, the quantity of first symbols is equal to the first threshold, in other words, the quantity of first symbols is equal to a quantity of symbols required for the beam switching.

In a possible implementation, the transmit end device maps a reference signal to an $N^{th}$ symbol after a third symbol, where a value of N is determined based on a location of a symbol to which the reference signal is to be mapped, the third symbol includes the first symbol and the second symbol, and N is a positive integer greater than or equal to 1. The third symbol may be referred to as a "switching symbol", that is, a symbol affected during the beam switching. It may alternatively be understood as that the sending device may determine, based on a location to which the reference signal is to be mapped, to map the reference signal to the $N^{th}$ symbol after the third symbol, where N is a positive integer greater than or equal to 1.

Specifically, if the location to which the reference signal is to be mapped overlaps the third symbol, in other words, when the quantity of second symbols is less than the first threshold, the data channel is not mapped to a symbol originally used to map the data channel, and if the symbol originally used to map the data channel is a symbol used to map the reference signal, the reference signal is not mapped to the symbol. Therefore, a location to which the reference signal is actually mapped needs to be changed. The location may be the $N^{th}$ symbol after the third symbol.

In another possible implementation, in a to-be-mapped symbol after the beam switching, if the to-be-mapped symbol does not include a symbol to be used to map the reference signal, the reference signal also needs to be added to the $N^{th}$ symbol after the third symbol.

For example, if the second symbols to be mapped to do not include a symbol to which the reference signal is to be mapped, and the second symbols to be mapped to is after the first symbols to be mapped to, the reference signal needs to be mapped to the $N^{th}$ symbol after the third symbol.

Optionally, the reference signal (RS) may be a demodulation reference signal (DMRS).

In a possible implementation, if a symbol to which a first signal is to be mapped overlaps the third symbol, the first signal is not mapped to the third symbol. It may alternatively be understood as that the sending device determines a location of the symbol to which the first signal is to be mapped, and when the symbol to which the first signal is to be mapped overlaps the third symbol, does not map the first signal to the third symbol.

Optionally, the first signal may be a control resource set (CORESET).

For example, if there is a symbol used to map the CORESET in the first symbol, the CORESET is not mapped to the symbol originally used to map the CORESET in the first symbol.

In a possible implementation, the beam corresponding to the first data channel is switched to the beam corresponding to the second data channel at a beam switching location, where the beam switching location is before the third symbol.

Specifically, the first data channel and the second data channel are two data channels that are adjacent in time domain, in other words, the first data channel and the second data channel are sequentially sent in time domain, and the first data channel and the second data channel correspond to different beams. To enable the transmit end device and the receive end device have a consistent understanding on the beam switching, both the transmit end device and the receive end device need to know a moment from which the beam switching starts. The transmit end device may notify the receiving device of the beam switching location, and the sending device may further notify the receiving device of a switching mode, for example, which data channels use a beam 1 and which data channels use a beam 2.

In a possible implementation, a value range of the first resource indication information is determined based on the first threshold, and a value range of the second resource indication information is determined based on the first threshold.

Specifically, a value range of the start symbol is determined based on the first threshold. For example, S is not less than the first threshold, in other words, S is greater than or equal to the quantity of symbols required for the beam switching.

In the foregoing descriptions, a data channel mapping rule of the transmit end device is also notified to the receiving device. In other words, the protocol specifies a same mapping rule for the sending device and the receiving device in advance. After the transmit end device maps the data channel according to the mapping rule, the receive end device receives and decodes the data channel according to the same mapping rule. Details of a specific implementation are not described in this embodiment of this application.

An example in which the network device maps a PDSCH and an example in which the terminal device maps a PUSCH are separately used below for description.

For example, an example in which a PDSCH is scheduled is used to describe the foregoing descriptions in detail. An example in which the time unit is a slot is used below for description.

When the network device needs to send data to the terminal device, the network device needs to map a PDSCH to a time-frequency resource. In this embodiment of this application, an example in which the PDSCH is mapped in time domain is mainly used for description.

The network device first determines a space domain in which transmission is performed. In other words, the network device determines a beam for sending the PDSCH. The beam may alternatively be understood as a spatial domain filter, a QCL assumption, a TCI status, or the like. In this embodiment of this application, two slots are used as an example for description. The two slots are a slot #1 and a slot #2, the slot #1 and the slot #2 each include 14 symbols, a PDSCH #1 is mapped to the slot #1, and a PDSCH #2 is mapped to the slot #2.

In a possible implementation, the network device determines that two adjacent PDSCHs in time domain correspond to different beams, and a symbol that does not carry data between the two PDSCHs is less than a symbol affected during beam switching.

For example, the network device may determine, in the following manners, that the PDSCHs correspond to different beams.

Manner 1:

The network device sends DCI to the terminal device, where the DCI is used to schedule the PDSCH. In addition, the DCI may further indicate a beam, that is, indicate the terminal device to receive data on the corresponding PDSCH by using the indicated beam. When a beam used to send the DCI is different from the beam that is used to receive the PDSCH and that is indicated by the DCI, the network device may determine that beam switching occurs between two PDSCHs. In other words, when QCL duration (time duration for QCL) ends, beam switching occurs between a corresponding PDSCH and a next PDSCH of the PDSCH.

In this application, if the PDSCH #1 and the PDSCH #2 are adjacent, and switching occurs between the PDSCH #1 and the PDSCH #2, it may be considered that a beam corresponding to the PDSCH #1 is different from a beam corresponding to the PDSCH #2. If only the PDSCH #1 is mapped to the slot #1, and only the PDSCH #2 is mapped to the slot #2, that the beam corresponding to the PDSCH #1 is different from the beam corresponding to the PDSCH #2 may alternatively be understood as that a beam corresponding to the slot #1 is different from a beam corresponding to the slot #2.

Manner 2:

For PDSCHs before QCL duration, if default beams corresponding to two adjacent PDSCHs in time domain are different, the network device may also determine that beams corresponding to the two PDSCHs are different.

Manner 3:

The network device may alternatively determine, based on a beam switching location, that the two adjacent PDSCHs in time domain correspond to different beams. The beam switching location may be learned of through higher layer signaling or physical layer configuration. When learning of the beam switching location, the network device may determine the two specific PDSCHs between which beam switching occurs. This means that the two adjacent PDSCHs correspond to different beams.

The foregoing descriptions are merely example descriptions of determining that the two adjacent PDSCHs in time domain correspond to different beams. As long as the network device can determine that the two PDSCHs correspond to different beams, a corresponding implementation falls within the protection scope of embodiments of this application. This is not described one by one in this embodiment of this application.

The symbol (a second symbol) that does not carry data between the two PDSCHs may be determined based on resource indication information. Each PDSCH has corresponding resource indication information. The resource indication information indicates a symbol to which the PDSCH needs to be mapped, and may be specifically an SLIV, in other words, indication information of a start symbol S and an allocation length L. Alternatively, the resource indication information directly indicates a symbol to which the PDSCH needs to be mapped. In this way, a resource used to carry a former PDSCH and a resource used to carry a latter PDSCH may be determined, and the symbol that does not carry data between the two PDSCHs may be understood as: There is no symbol that carries data between the last symbol indicated by resource indication information of the former PDSCH and a start symbol indicated by resource indication information of the latter PDSCH.

For example, an example in which the resource indication information is an SLIV, and the two PDSCHs are separately a PDSCH #1 and a PDSCH #2 in a same time unit is used for description. A slot is still used as an example of the time unit, and each slot has 14 symbols in total, for example, a symbol 0 to a symbol 13. S=0 and L=3 corresponding to the PDSCH #1 may be understood as three consecutive symbols starting from a symbol 0. S=5 and L=4 corresponding to the PDSCH #2 may be understood as four consecutive symbols starting from a symbol 5. If there is no other PDSCH between the PDSCH #1 and the PDSCH #2, there are two symbols that do not carry data between the two PDSCHs, that is, a symbol 3 and a symbol 4.

For another example, an example in which the resource indication information is an SLIV, and each slot has 14 symbols (a symbol 0 to a symbol 13) in total is still used for description. A PDSCH #1 is mapped to a slot #1, a PDSCH #2 is mapped to a slot #2, and the slot #1 and the slot #2 are adjacent slots. In addition, no PDSCH other than the PDSCH #1 is mapped in the slot #1, and no PDSCH other than the PDSCH #2 is mapped in the slot #2. The PDSCH #1 corresponds to S=0 and L=7, in other words, corresponds to seven consecutive symbols starting from a symbol 0. The PDSCH #2 corresponds to S=3 and L=5, in other words, corresponds to five consecutive symbols starting from a symbol 3. The slot #1 is before the slot #2. Symbols that do not carry data between the two PDSCHs include: a symbol 7 to a symbol 13 in the slot #1 and a symbol 0 to a symbol 2 in the slot #2. In this application, there are a total of 10 symbols that do not carry data between the two PDSCHs.

For another example, an example in which the resource indication information is an SLIV, and each slot has 14 symbols in total is still used for description. A PDSCH #1 is mapped to a slot #1, a PDSCH #2 is mapped to a slot #2, and the slot #1 and the slot #2 are adjacent slots. The PDSCH #1 corresponds to S=0 and L=14, in other words, corresponds to 14 consecutive symbols starting from a symbol 0. The PDSCH #2 corresponds to S=0 and L=14, in other words, corresponds to 14 consecutive symbols starting from a symbol 0. The slot #1 is before the slot #2. There is no symbol that does not carry data between the two PDSCHs.

In other words, a quantity of symbols (second symbols) that do not carry data between the two adjacent PDSCHs in time domain may be 0, or may be a positive integer greater than 0.

A quantity of symbols in the time unit and the resource indication information corresponding to each PDSCH are merely examples for description. Specific values of the quantity and the resource indication information are determined based on an actual transmission situation. Details are not described herein.

A symbol required for the beam switching is determined based on a capability of the terminal device. In other words, the terminal device reports, to the network device, time required for switching from one beam to another beam. Therefore, a quantity of symbols corresponding to the time may be learned of through inference. A specific implementation is not limited in this embodiment of this application. In addition, in this embodiment of this application, each time the terminal device performs beam switching, time required for the beam switching may be consistent or may be inconsistent. Therefore, the terminal device may perform reporting to the network device only once, or may perform reporting to the network device for a plurality of times. This is not limited in this embodiment of this application.

When it is determined that the two adjacent PDSCHs in time domain correspond to different beams, and the symbol that does not carry data between the two PDSCHs is less than the symbol required for the beam switching, the network device may introduce a first symbol, and the first symbol may be located on a previous PDSCH, or the first symbol is located on a current PDSCH, or a part of the first symbol is located on the previous PDSCH and a part of the first symbol is located on the current PDSCH.

The first symbol is a symbol in symbols to be mapped to, that is, a symbol originally used to map the PDSCH. However, if the first symbol is used for the beam switching, the PDSCH is no longer mapped to the first symbol. For example, that the first symbol is located on the former PDSCH may be understood as that the former PDSCH is not mapped to some symbols, on the PDSCH, to which the PDSCH originally needs to be mapped. Specifically, the former PDSCH originally needs to be mapped to a symbol 0 to a symbol 13 (symbols to be mapped to), but is not mapped to a symbol 12 and the symbol 13. In this case, the symbol 12 and the symbol 13 may be referred to as first symbols.

For example, the first symbol needs to be before the second symbol and/or after the second symbol, or the first symbol is adjacent to the second symbol. The first symbol and the second symbol may be referred to as a third symbol, that is, the symbol required for the beam switching.

For example, a PDSCH #1 is originally mapped to a symbol 0 to a symbol 11 (first symbols to be mapped to), and a PDSCH #2 is originally mapped to a symbol 0 to a symbol 10 (second symbols to be mapped to), where the PDSCH #1 is located in a slot #1, the PDSCH #2 is located in a slot #2, and the slot #1 is before the slot #2. A beam corresponding to the PDSCH #1 is different from a beam corresponding to the PDSCH #2, so that beam switching needs to be performed. However, a quantity of symbols (referred to as a first threshold for short below) required for the beam switching is 5. However, a quantity of symbols that do not carry data between the two PDSCHs is 2, and is less than the first threshold. Therefore, it may be determined that there are three first symbols, and the first symbols may be selected in the following several manners.

Manner 1: All the first symbols are located on the PDSCH #1. To be specific, the PDSCH #1 is no longer mapped to a symbol 9, a symbol 10, and the symbol 11 corresponding to the PDSCH #1 in the slot #1, and third symbols are the symbol 9 to a symbol 13 in the slot #1.

Manner 2: All the first symbols are located on the PDSCH #2. To be specific, the PDSCH #2 is no longer mapped to the symbol 0, a symbol 1, and a symbol 2 corresponding to the PDSCH #2 in the slot #2, and third symbols are a symbol 12 and a symbol 13 in the slot #1 and the symbol 0 to the symbol 2 in the slot #2.

Manner 3: A part of first symbols are located on the PDSCH #1, and a part of first symbols are located on the PDSCH #2. For example, one first symbol is located on the PDSCH #1, to be specific, the PDSCH #1 is no longer mapped to the symbol 11 corresponding to the PDSCH #1 in the slot #1, two first symbols are located on the PDSCH #2, to be specific, the PDSCH #2 is no longer mapped to the symbol 0 and a symbol 1 corresponding to the PDSCH #2 in the slot #2, and third symbols are the symbol 11 to a symbol 13 in the slot #1 and the symbol 0 and the symbol 1 in the slot #2. For another example, two first symbols are located on the PDSCH #1, to be specific, the PDSCH #1 is no longer mapped to a symbol 10 and the symbol 11 corresponding to the PDSCH #1 in the slot #1, one first symbol is located on the PDSCH #2, to be specific, the PDSCH #2 is no longer mapped to the symbol 0 corresponding to the PDSCH #2 in the slot #2, and third symbols are the symbol 10 to a symbol 13 in the slot #1 and the symbol 0 in the slot #2.

For another example, a PDSCH #1 is mapped to a symbol 0 to a symbol 13 in a slot #1, a PDSCH #2 is mapped to a symbol 0 to a symbol 13 in a slot #2, and an example in which each slot has 14 symbols is still used. In addition, the slot #1 is before the slot #2, and a beam corresponding to the PDSCH #1 is different from a beam corresponding to the PDSCH #2. A first threshold is 5, in other words, a quantity of symbols for beam switching is 5. However, a quantity of second symbols between the PDSCH #1 and the PDSCH #2 is 0. Therefore, the PDSCH #1 is no longer mapped to five symbols corresponding to the PDSCH #1 in the slot #1, or the PDSCH #2 is no longer mapped to five symbols corresponding to the PDSCH #2 in the slot #2, or the PDSCH #1 is no longer mapped to Q symbols corresponding to the PDSCH #1 in the slot #1 and the PDSCH #2 is no longer mapped to P symbols corresponding to the PDSCH #2 in the slot #2, where Q is a positive integer greater than 0, P is also a positive integer greater than 0, and a sum of Q and P is 5. In this case, third symbols include only second symbols, and the third symbols may be the last five symbols of the slot #1, or may be the first five symbols of the slot #2, or may be the last Q symbols of the slot #1 and the first P symbols of the slot #2.

The foregoing descriptions may alternatively be understood as follows: A first threshold is L, and L is a positive integer greater than 0. A PDSCH #1 is no longer mapped to the last Q symbols corresponding to the PDSCH #1, and a PDSCH #2 is no longer mapped to the first P symbols corresponding to the PDSCH #2. The PDSCH #1 is before the PDSCH #2, there is no other PDSCH between the PDSCH #1 and the PDSCH #2, and there is no symbol that does not carry data between the PDSCH #1 and the PDSCH #2. In this case, a sum of M and P is equal to L, M is equal to 0 or a positive integer greater than 0, and P is also equal to 0 or a positive integer greater than 0.

In this application, the third symbol may also be referred to as a switching symbol. The third symbol may be located at the end of a previous time unit or at the beginning of a current time unit, or may be located at the end of the previous time unit and the beginning of the current time unit. This is not limited in this embodiment of this application.

The foregoing descriptions are merely example descriptions. As long as the foregoing meanings can be expressed, a corresponding implementation falls within the protection scope of embodiments of this application. This is not listed one by one in this embodiment of this application.

In the foregoing example descriptions, when the two adjacent PDSCHs in time domain correspond to different beams, the quantity of symbols that do not carry data between the two PDSCHs is compared with the first threshold. When the quantity of symbols that do not carry data is greater than the first threshold, an existing implementation may be used. Details are not described in this embodiment of this application.

In a possible implementation, the network device may further notify the terminal device of the beam switching location. For example, a base station may configure a beam switching mode, to be specific, which PDSCHs use abeam #1, and which PDSCHs use abeam #2. The beam switching location is usually before the third symbol, and indicates that a beam change starts.

Figure 6:
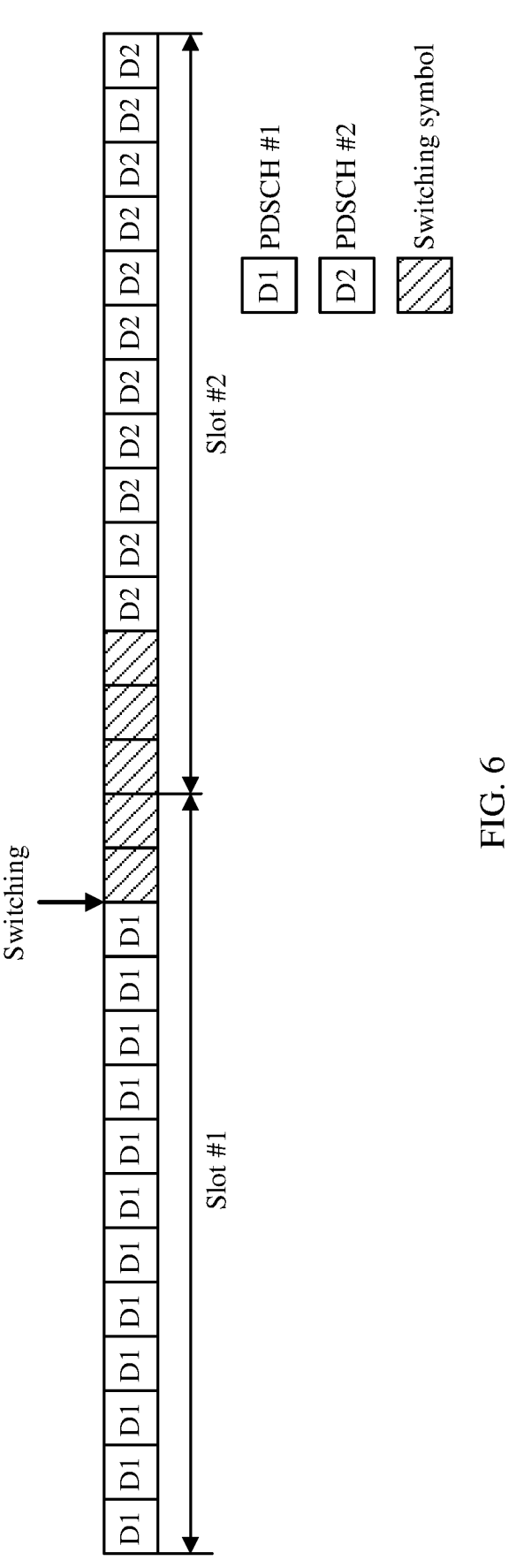
FIG. 6 is a schematic diagram of a beam switching location according to an embodiment of this application.

For example, a PDSCH #1 corresponds to the beam #1, a PDSCH #2 corresponds to the beam #2, and the PDSCH #1 and the PDSCH #2 are adjacent. As shown in FIG. 6, D1 represents a symbol to which the PDSCH #1 is mapped in a slot #1, D2 represents a symbol to which the PDSCH #2 is mapped in a slot #2, the PDSCH #1 corresponds to S=0 and L=11, and the PDSCH #2 corresponds to S=3 and L=13. There are five beam switching symbols, and the five symbols are separately located on a symbol 12 and a symbol 13 in the slot #1 and a symbol 0 to a symbol 2 in the slot #2. A switching location is at the end of the symbol 11 or at the beginning of the symbol 12 in the slot #1, in other words, before third symbols. The third symbols are the switching symbols, and the switching location indicates that the beam #1 starts to be switched to the beam #2.

Figure 7:
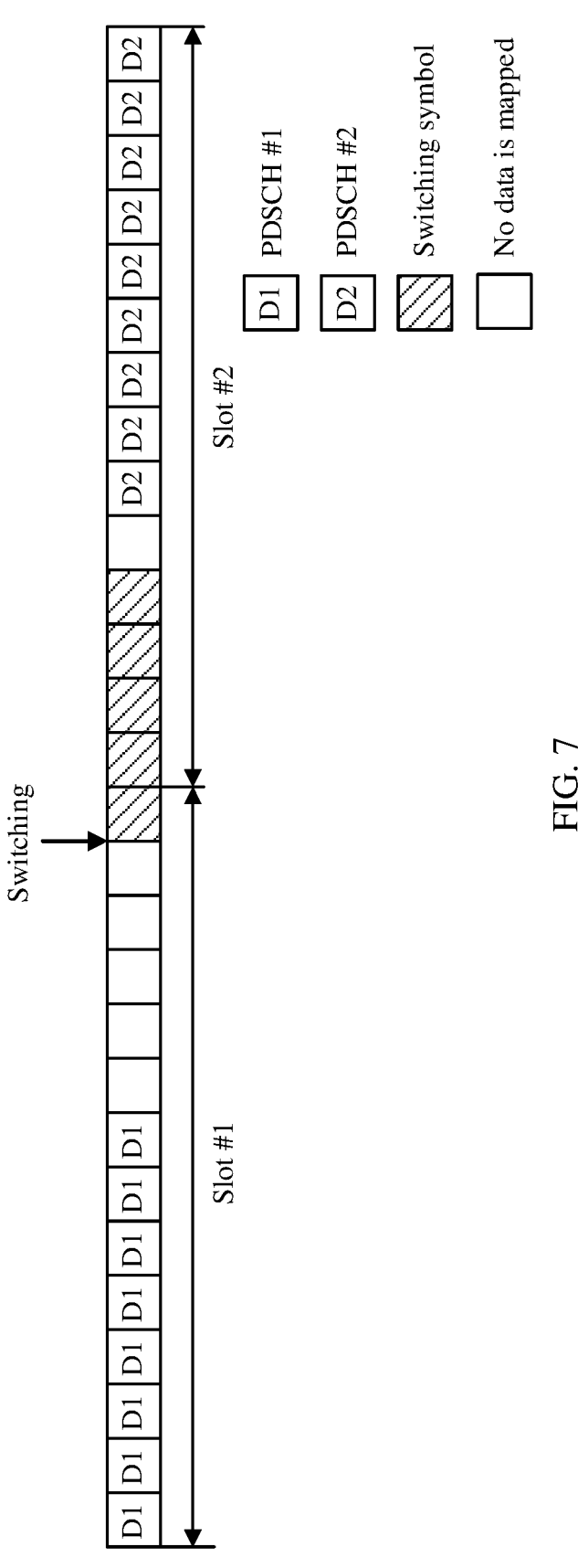
FIG. 7 is a schematic diagram of another beam switching location according to an embodiment of this application.

When the quantity of symbols to which data is not mapped between the two adjacent PDSCHs in time domain is greater than the quantity of symbols required for the beam switching, the switching location may be shown in FIG. 7. For example, a PDSCH #1 is connected to a PDSCH #2, D1 represents a symbol to which the PDSCH #1 is mapped in a slot #1, D2 represents a symbol to which the PDSCH #2 is mapped in a slot #2, the PDSCH #1 corresponds to S=0 and L=7, and the PDSCH #2 corresponds to S=5 and L=13. A quantity of symbols to which data is not mapped between the two PDSCHs is 11. A quantity of symbols required for beam switching is 5, and the five symbols are located on a symbol 13 in the slot #1 and a symbol 0 to a symbol 3 in the slot #2. A beam switching location is at the beginning of the symbol 13 in the slot #1, in other words, before third symbols, and the third symbols are the switching symbols.

In a possible implementation, the PDSCH may further carry an RS, for example, a DMRS. When the quantity of symbols to which data is not mapped between the two adjacent PDSCHs in time domain is less than the quantity of symbols required for the beam switching, the previous PDSCH may be no longer mapped to the last several symbols of the PDSCH, or the current PDSCH may be no longer mapped to the first several symbols of the PDSCH, or the previous PDSCH may be no longer mapped to some symbols of the PDSCH and the current PDSCH may be no longer mapped to some symbols of the PDSCH. For the latter two cases, the following symptom may exist: A symbol originally used to map the reference signal becomes a switching symbol, in other words, the reference signal is not mapped to the symbol originally used to map the reference signal. For the current PDSCH, no reference signal is finally carried. Therefore, a mapping location of the reference signal is changed. The reference signal may be mapped to an $N^{th}$ symbol after the third symbol.

Figure 8:
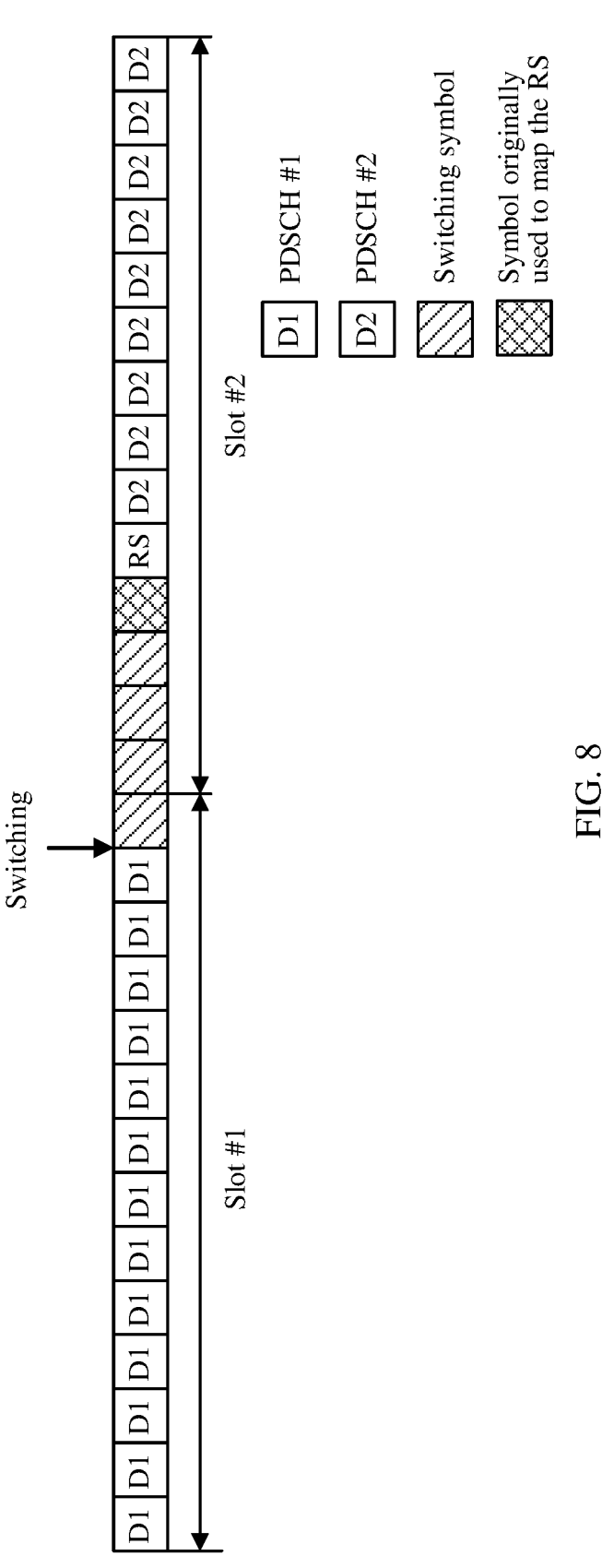
FIG. 8 is a schematic diagram of a reference signal mapping method according to an embodiment of this application.

For example, as shown in FIG. 8, a PDSCH #1 is connected to a PDSCH #2, D1 represents a symbol to which the PDSCH #1 is mapped in a slot #1, D2 represents a symbol to which the PDSCH #2 is mapped in a slot #2, the PDSCH #1 corresponds to S=0 and L=13, and the PDSCH #2 corresponds to S=3 and L=13. A quantity of symbols required for beam switching is 5, and a symbol 3 in the slot #2 is selected as a switching symbol. However, the symbol 3 is a symbol originally used to map an RS. Therefore, the RS may be mapped to the first symbol after a third symbol, that is, the RS is mapped to a symbol 4.

Figure 9:
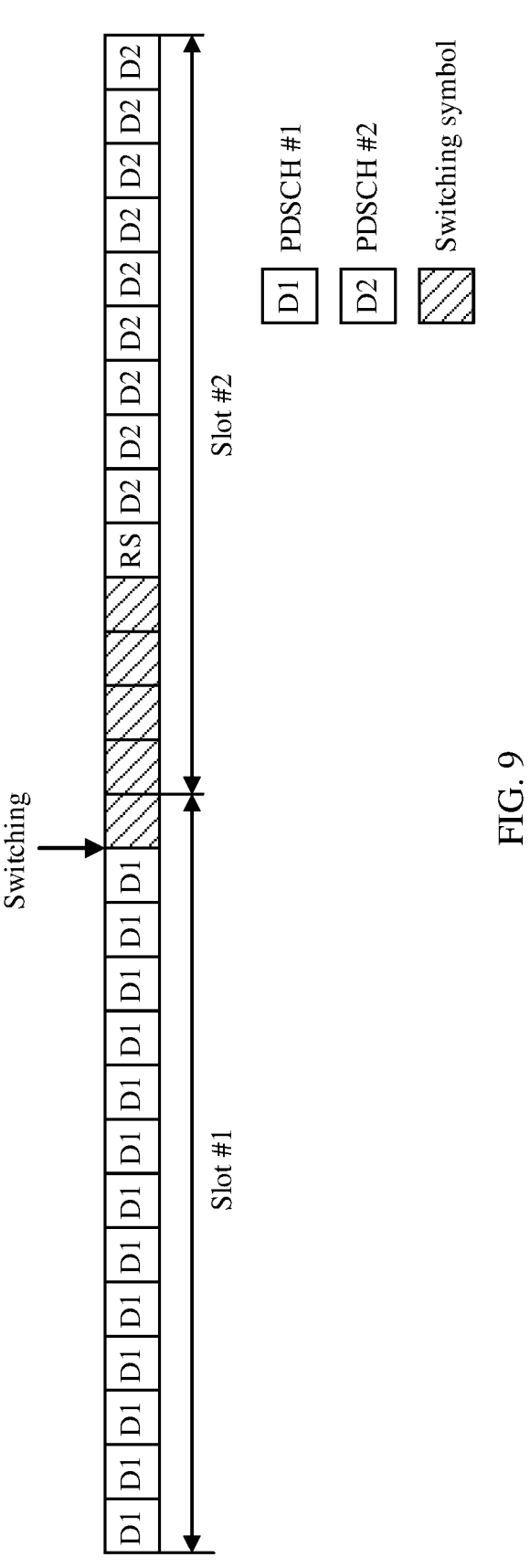
FIG. 9 is a schematic diagram of another reference signal mapping method according to an embodiment of this application.

For another example, as shown in FIG. 9, a PDSCH #1 is connected to a PDSCH #2, D1 represents a symbol to which the PDSCH #1 is mapped in a slot #1, D2 represents a symbol to which the PDSCH #2 is mapped in a slot #2, the PDSCH #1 corresponds to S=0 and L=13, and the PDSCH #2 corresponds to S=3 and L=13. A quantity of symbols required for beam switching is 5, and a switching location is between a symbol 12 and a symbol 13 in the slot #1. However, there is no symbol used to map an RS in the slot #2. In other words, if no RS is originally mapped to a slot after the beam switching location, an RS is mapped to an $N^{th}$ symbol after a third symbol. For example, in FIG. 9, there is no symbol originally used to map an RS in the slot #2. In this case, an RS is mapped to a symbol 4 in the slot #2, in other words, the RS is mapped to the first symbol after the third symbol.

The foregoing descriptions are merely example descriptions. As long as there is no RS symbol in a time unit in which a PDSCH after switching is located, and an RS mapping symbol is added, a corresponding implementation falls within the protection scope of embodiments of this application. This is not limited.

In a possible implementation, another signal may further need to be mapped to the time unit in which the PDSCH is located. If the another signal needs to be mapped, a symbol to which the another signal needs to be mapped becomes a switching symbol (a third symbol), and the another signal is no longer mapped. For example, the another signal is a control resource set (CORESET). If the third symbol includes a symbol that is originally used to map the CORESET, the CORESET is no longer mapped to the symbol that is originally used to map the CORESET.

The foregoing process is a process in which the network device maps the PDSCH. For a process in which the terminal device receives the PDSCH, refer to a current technology. However, when the terminal device receives different and adjacent PDSCHs in time domain, because there is a switching symbol between any two different and adjacent PDSCHs, the terminal device can accurately receive each PDSCH and accurately decode the mapped PDSCH.

In this embodiment of this application, both the terminal device side and the network device clearly know the PDSCH mapping rule, in other words, when the two adjacent PDSCHs in time domain correspond to different beams, the network device and the terminal device know whether the symbol required for the beam switching occupies a symbol to which the PDSCH is to be mapped. Therefore, the network device and the terminal device have a consistent understanding on symbols to which the PDSCHs are actually mapped, and this helps improve receiving performance of the PDSCHs.

An example in which a PUSCH is mapped is used below to describe the foregoing descriptions in detail. An example in which the time unit is a slot is used below for description.

For the PUSCH, when the terminal device sends data to the network device, the terminal device needs to map a PUSCH to a time-frequency resource. In this embodiment of this application, an example in which the PUSCH is mapped in time domain is mainly used for description.

A process in which the terminal device maps a PUSCH in a time unit is similar to a process in which the network device maps a PDSCH in a time unit. For details of mapping the PUSCH, refer to the foregoing descriptions. For brevity, only a difference between the two is described below.

The terminal device needs to receive resource indication information of each PUSCH from the network device. For example, the terminal device receives an SLIV corresponding to each PUSCH. In this case, the terminal device may determine whether two adjacent PUSCHs correspond to a same beam. The terminal device may determine, in the following manners, that the two adjacent PUSCHs correspond to different beams.

Manner 1:

If default beams corresponding to the two adjacent PUSCHs are different, the terminal device may determine that the beams corresponding to the two PUSCHs are different.

For example, a PUSCH #1 and a PUSCH #2 are adjacent in time domain, a default beam of the PUSCH #1 is a beam 1, and a default beam of the PUSCH #2 is a beam 2. If the beam 1 and the beam 2 are different beams, it may be considered that the default beam of the PUSCH #1 is different from the default beam of the PUSCH #2. If the beam 1 and the beam 2 are a same beam, it may be considered that the default beam of the PUSCH #1 is the same as the default beam of the PUSCH #2. If only the PUSCH #1 is mapped to a slot #1, and only the PUSCH #2 is mapped to a slot #2, that the beam corresponding to the PUSCH #1 is different from the beam corresponding to the PUSCH #2 may alternatively be understood as that a beam corresponding to the slot #1 is different from a beam corresponding to the slot #2.

Manner 2:

The terminal device may alternatively determine, based on a beam switching location, that the adjacent PUSCHs correspond to different beams. The beam switching location may be learned of based on signaling sent by the network device. When learning of the beam switching location, the terminal device may determine the two specific PUSCHs between which beam switching occurs.

The foregoing descriptions are merely example descriptions of determining that the two adjacent PUSCHs in time domain correspond to different beams. As long as the terminal device can determine that the two adjacent PUSCHs in time domain correspond to different beams, a corresponding implementation falls within the protection scope of embodiments of this application. This is not described one by one in this embodiment of this application.

For how the terminal device determines symbols to which the PUSCHs are mapped, whether a symbol to which the PUSCH is to be mapped needs to be occupied, how to determine a switching location, and the like, refer to the foregoing descriptions of the PDSCH. This is not described one by one.

Figure 10:
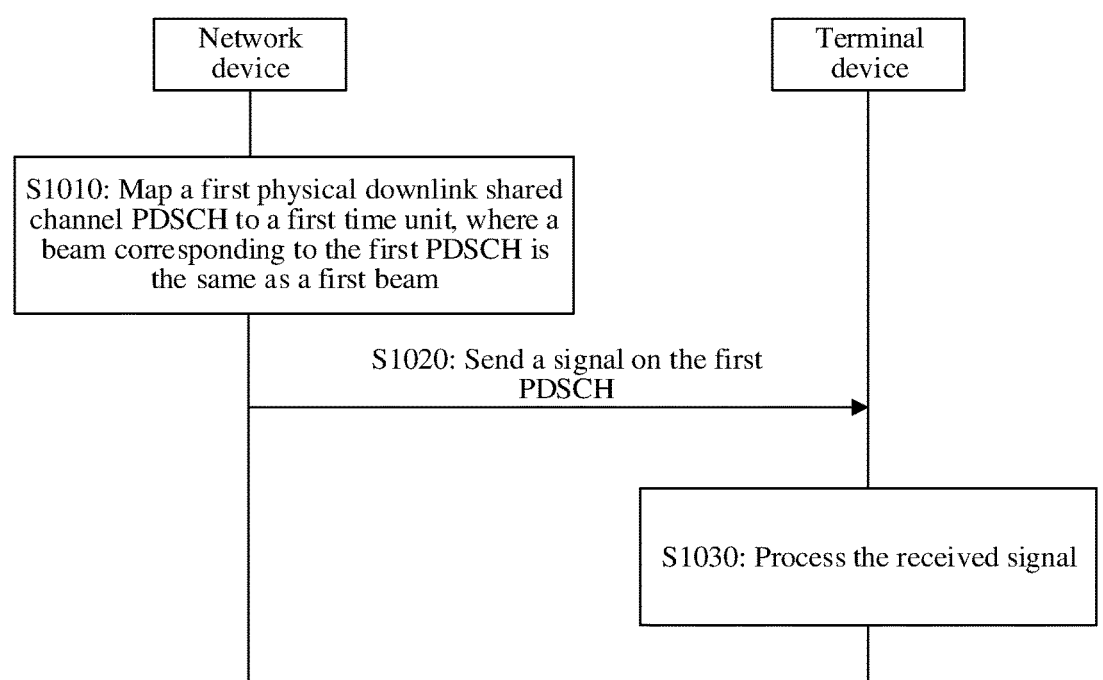
FIG. 10 is a schematic flowchart of another resource mapping method 1000 according to an embodiment of this application.

FIG. 10 is a schematic flowchart of another resource mapping method according to this application. As shown in FIG. 10, the method may include steps S1010 to S1030. The following describes each step in detail.

S1010: A network device maps a first physical downlink shared channel PDSCH to a first time unit, where a beam corresponding to the first PDSCH is the same as a first beam.

S1020: The network device sends a signal on the first PDSCH.

S1030: A terminal device processes the received signal.

For example, an example in which a PDSCH is scheduled is used for detailed description. An example in which a time unit is a slot is used below for description.

For example, the time unit may be a symbol, a mini-slot, a slot, or a subframe. This is not limited in this application. However, in this embodiment of this application, that the time unit is a slot is used for description. For an implementation process in another time unit, refer to the descriptions in this embodiment of this application.

The network device may map a PDSCH to a time-frequency resource, to send data to a receiving device. In this embodiment of this application, an example in which the PDSCH is mapped in time domain is used for description.

The network device first determines a space domain in which transmission is performed. In other words, the network device determines a beam for sending the PDSCH. The beam may alternatively be understood as a spatial domain filter, a QCL assumption, a TCI status, or the like. In this application, a beam (referred to as a first beam below) is specified, and the beam corresponding to the PDSCH is compared with the first beam. If the beam corresponding to the PDSCH is the same as the first beam, the PDSCH may be mapped to the first time unit. Otherwise, the PDSCH is not mapped to the first time unit.

In a possible implementation, the first beam includes a second beam and a third beam, the second beam includes a beam corresponding to first indication information or a preconfigured beam, and the third beam includes a beam corresponding to the first indication information, a beam indicated by the first indication information, or a preconfigured beam. The first indication information indicates to schedule the PDSCH. For example, the first indication information may be DCI.

It should be understood that the second beam may be predefined in a protocol, in other words, predefined for both the terminal device and the network device, or may be notified by the network device to the terminal device by using signaling, where the signaling includes but is not limited to RRC signaling.

In a possible implementation, when a first time unit (or a first resource) is before an end location of first duration, if the network device determines that the beam corresponding to the PDSCH is the same as the second beam, the network device maps the PDSCH to the first time unit. Alternatively, if the network device determines that the beam corresponding to the PDSCH is different from the second beam, the network device does not map the PDSCH to the first time unit. The first duration is associated with processing time of the terminal device.

In a possible implementation, when a first time unit is after an end location of first duration, if the network device determines that the PDSCH has a high priority and the beam corresponding to the PDSCH is consistent with the third beam, the network device maps the PDSCH to the first time unit. Alternatively, if the network device determines that the PDSCH has a high priority and the beam corresponding to the PDSCH is different from the third beam, the network device does not map the PDSCH to the first time unit.

Figure 11:
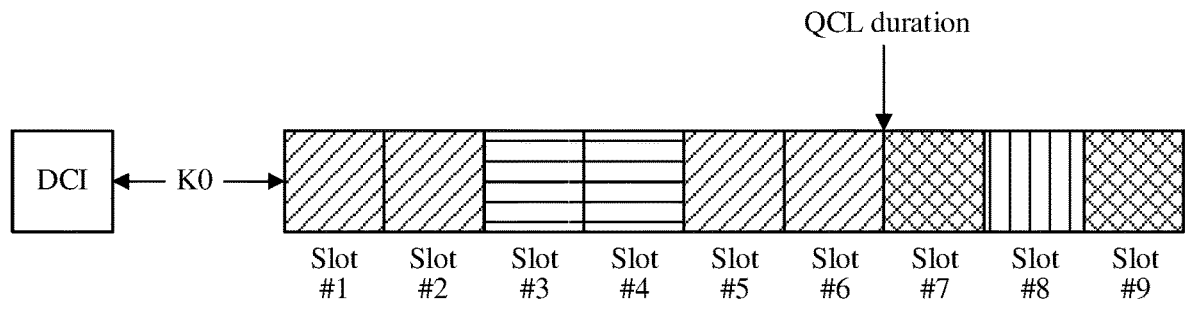
FIG. 11 is a schematic diagram of a PDSCH mapping method according to an embodiment of this application.
Figure 11:
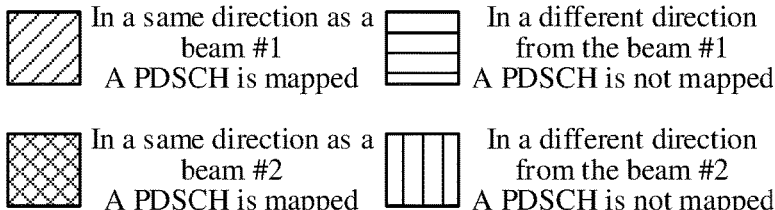

For example, a same PDSCH or a different PDSCH may be mapped to each time unit, and one PDSCH or a plurality of PDSCHs may be mapped to each time unit. When a plurality of PDSCHs are mapped, the PDSCHs may be the same or different. In the following descriptions, the time unit is a slot, and one PDSCH is mapped to each slot. It should be noted that, in the following descriptions, that beams of slots are the same or different may be understood as that beams of PDSCHs are the same or beams corresponding to PDSCHs are different. For example, a PDSCH #1 is mapped to a slot #1, and a PDSCH #2 is mapped to a slot #2. That beams of the slot #1 and the slot #2 are different may be understood as that a beam corresponding to the PDSCH #1 is different from a beam corresponding to the PDSCH #2. As shown in FIG. 11, a total of nine slots are shown, where a beam switching location is between a slot #6 and a slot #7, K0 is an interval between a slot in which DCI is located and a PDSCH scheduled by the DCI, QCL duration may be equivalent to first duration, and the location between the slot #6 and the slot #7 may also be referred to as an end location of the first duration.

The first duration is associated with processing time of the terminal device. It may be considered that the first duration is time used by the terminal device, after the terminal device receives the DCI that schedules the PDSCH, in a series of processes such as decoding the DCI and switching to a beam indicated by the DCI after decoding is completed.

In this application, an example in which the DCI is sent by using a beam #1, in other words, a beam corresponding to the DCI is the beam #1, the DCI indicates a beam #2, a beam specified in the QCL duration is the beam corresponding to the DCI, that is, the beam #1, and a direction specified after the end of the QCL duration is a direction indicated by the DCI is used for detailed description.

The beam specified in the QCL duration may be a beam corresponding to a slot, in other words, a beam corresponding to a PDSCH mapped to the slot. For example, if a PDSCH #3 is mapped to a slot #3, the beam specified in the QCL duration may be a beam corresponding to the slot #3. Alternatively, the beam specified in the QCL duration may be a preconfigured beam, for example, a beam #4. A beam after the end of the QCL duration may be a beam indicated by the DCI. If the DCI does not indicate a beam, the beam after the end of the QCL duration may alternatively be the beam corresponding to the DCI, a preconfigured beam, a beam corresponding to a PDSCH mapped to a slot, or the like.

To better distinguish between beams before and after an end location of the QCL duration, a beam specified before the end location of the QCL duration may be considered as a second beam, and a beam specified after the end location of the QCL duration may be considered as a third beam.

The second beam and the third beam may be the same or different, and are determined based on an actual situation. This is not limited in this embodiment of this application.

For specified beam selection, the specified beam may be configured by a higher layer for the terminal device and the network device, or may be predefined in the protocol. Alternatively, the network device may configure a plurality of beams, and notify the terminal device of the beams by using RRC signaling. This is not limited in this embodiment of this application.

For example, in FIG. 11, a PDSCH #1 is mapped to a slot #1 and a corresponding beam is the beam #1, a PDSCH #2 is mapped to a slot #2 and a corresponding beam is the beam #1, a PDSCH #3 is mapped to a slot #3 and a corresponding beam is a beam #3, a PDSCH #4 is mapped to a slot #4 and a corresponding beam is a beam #4, a PDSCH #5 is mapped to a slot #5 and a corresponding beam is the beam #1, a PDSCH #6 is mapped to the slot #6 and a corresponding beam is the beam #1, a PDSCH #7 is mapped to the slot #7 and a corresponding beam is the beam #2, a PDSCH #8 is mapped to a slot #8 and a corresponding beam is the beam #1, and a PDSCH #9 is mapped to a slot #9 and a corresponding beam is the beam #2.

A same PDSCH or a different PDSCH may be mapped to each slot. In other words, in a plurality of PDSCHs, PDSCHs mapped to any two slots may be the same or different. This is not limited in this embodiment of this application.

For the network device, the network device may compare a beam of each PDSCH with a specified direction. When the beam of each PDSCH is the same as the specified direction, the network device may map the PDSCH. When the beam of each PDSCH is different from the specified direction, the network device does not map the PDSCH.

For example, a process in which the network device maps a PDSCH is used as an example for description. The slot #1 to the slot #6 are all before the end location of the QCL duration. Therefore, a to-be-mapped PDSCH in each slot needs to be compared with the beam #1. If the PDSCH is the same as the beam #1, the PDSCH is mapped. If the PDSCH is different from the beam #1, the PDSCH is not mapped. Beams of PDSCHs that need to be mapped to the slot #7 to the slot #9 are compared with the beam #2.

For example, the beam of the PDSCH #1 that needs to be mapped to the slot #1 is the same as the specified beam #1, so that the PDSCH #1 may be mapped to the slot #1; the beam of the PDSCH #2 that needs to be mapped to the slot #2 is the same as the specified beam #1, so that the PDSCH #2 may be mapped to the slot #2; the beam of the PDSCH #3 that needs to be mapped to the slot #3 is different from the specified beam #1, so that the PDSCH #3 is not mapped to the slot #3; the beam of the PDSCH #4 that needs to be mapped to the slot #4 is different from the specified beam #1, so that the PDSCH #4 is not mapped to the slot #4; the beam of the PDSCH #5 that needs to be mapped to the slot #5 is in a same direction as the specified beam #1, so that the PDSCH #5 may be mapped to the slot #5; the beam of the PDSCH #6 that needs to be mapped to the slot #6 is in a same direction as the specified beam #1, so that the PDSCH #6 may be mapped to the slot #6. The beam of the PDSCH #7 that needs to be mapped to the slot #7 is in a same direction as the specified beam #2, so that the PDSCH #7 may be mapped to the slot #7; the beam of the PDSCH #8 that needs to be mapped to the slot #8 is different from the specified beam #2, so that the PDSCH #8 is not mapped to the slot #8; the beam of the PDSCH #9 that needs to be mapped to the slot #9 is the same as the specified beam #2, so that the PDSCH #9 may be mapped to the slot #9.

The beams of the PDSCHs that need to be mapped to the slot #7 to the slot #9 may be beams corresponding to high-priority PDSCHs. In other words, the beams corresponding to the high-priority PDSCHs are compared with the beam #2. The high-priority PDSCH may mean that a message sent by the network device has a high priority, where the message is, for example, a system message or an ultra reliable and low latency communication (URLLC) message.

For the terminal device, after receiving the PDSCH, the terminal device compares a beam of each PDSCH with a specified direction. When the beam of each PDSCH is the same as the specified direction, the terminal device knows that the PDSCH is mapped, and may decode the PDSCH. When the beam of each PDSCH is different from the specified direction, the terminal device knows that the PDSCH is not mapped or the carried PDSCH is not a PDSCH required by the terminal device, and does not receive and decode the PDSCH.

For example, when receiving the PDSCH, the terminal device receives the PDSCH in a direction corresponding to the PDSCH. To be specific, the terminal device receives the PDSCH #1 on the beam #1, receives the PDSCH #2 on the beam #1, receives the PDSCH #3 on the beam #3 (that is, beam switching occurs between receiving of the PDSCH #2 and receiving of the PDSCH #3), and receives the PDSCH #4 on the beam #4 (that is, beam switching occurs between the receiving of the PDSCH #3 and receiving of the PDSCH #4). This is also true for other PDSCHs. This may alternatively be understood as that the terminal device performs receiving based on a default beam of each PDSCH, and when default beams are different, beam switching occurs. It should be noted that, for the terminal device, when performing receiving in the slot #3 corresponding to the PDSCH #3 and the slot #4 corresponding to the PDSCH #4, the terminal device does not know whether PDSCHs are mapped to the slot #3 and the slot #4, and only performs receiving. Then, beams used for receiving are compared with the specified beam, to determine whether the PDSCHs are mapped.

For example, if the terminal device receives the PDSCH #1 on the beam #1, and the receive beam of the PDSCH #1 is the same as the specified beam, it may be determined that the PDSCH #1 is mapped to the slot #1; if the terminal device performs receiving in the slot #3 on the beam #3, and the beam #3 is different from the specified beam, it may be determined that the PDSCH #2 is not mapped to the slot #3. Whether a PDSCH is mapped to another slot is also determined in this manner. For brevity, this is not listed one by one in this embodiment of this application.

In a possible implementation, the terminal device may further consider that an offset (for example, K0) is related to a beam switching capability, and the switching capability includes but is not limited to the QCL duration. To be specific, the terminal device considers that K0 occurs in X units of beam switching, and X is an integer. If X is greater than 0, it indicates that K0 occurs in X time units after the beam switching; if X is less than 0, it indicates that K0 occurs in X time units before the beam switching; if X is equal to 0, it indicates that K0 occurs in a current time unit of the beam switching.

In another possible implementation, the protocol may further specify that the terminal device does not consider that a beam of a PDSCH in a plurality of time units may change, in other words, the terminal device receives the PDSCH only by using a same receive beam.

In another possible implementation, second indication information is obtained, where the second indication information indicates that the beam corresponding to the first PDSCH is different from a beam corresponding to a PDSCH (a third PDSCH or a second PDSCH) sent at a previous moment.

The second indication information may be configured by using higher layer signaling or a physical layer. After obtaining the second indication information, the network device or the terminal device knows that the beam corresponding to the first PDSCH is different from the beam corresponding to the PDSCH (the third PDSCH) scheduled at the previous moment, and needs to further determine whether the first PDSCH is the same as the first beam. It may alternatively be understood that after obtaining the second indication information, the terminal device and the network device may clearly know whether to perform resource mapping according to the foregoing mapping rule.

For multi-slot PDSCH scheduling, the multi-slot PDSCH scheduling may be further combined with the embodiment corresponding to FIG. 2. This is not limited in this embodiment of this application.

In the foregoing solution, the default beam of the PDSCH is compared with the specified beam, to determine whether the PDSCH is mapped. In addition, both the terminal device and the network device decode and map the PDSCH according to this rule, so that frequent beam switching is avoided, and the terminal device and the network device have a same understanding on resource mapping of the PDSCH.

It should be understood that the protocol may specify a plurality of mapping rules in advance. For example, the network device and the terminal device are not only configured with the resource mapping rule corresponding to the method 200 in FIG. 2, but also configured with the mapping rule corresponding to the method 1000 in FIG. 10. In addition, the network device and the terminal device may be also configured with another resource mapping rule. In this case, the network device may send indication information to the terminal device, to indicate one or more resource mapping rules used by the network device for mapping. Specifically, the network device sends RRC signaling to the terminal device. One or more specific mapping rules used in this embodiment of this application are not limited. The foregoing describes in detail the resource scheduling methods with reference to FIG. 2 to FIG. 11. The following describes in detail communication apparatuses provided in embodiments of this application with reference to FIG. 12 to FIG. 14. It should be understood that descriptions of apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element, for example, the transmit end device or the receive end device, includes corresponding hardware structures and/or software modules for performing the functions. A person skilled in the art should be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the transmit end device or the receive end device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division during actual implementation. An example in which each functional module is obtained through division based on each corresponding function is used below for description.

Figure 12:
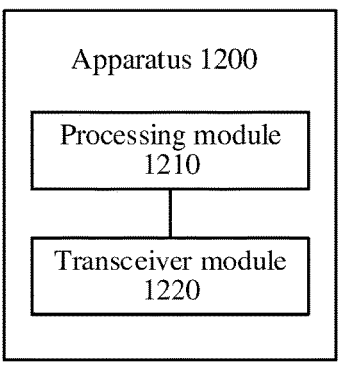
FIG. 12 is a schematic block diagram of a resource mapping apparatus 1200 according to an embodiment of this application.

FIG. 12 is a schematic block diagram of a communication apparatus according to an embodiment of this application. The communication apparatus 1200 includes a processing module 1210 and a transceiver module 1220. The processing module 1210 is configured to process data, and the transceiver module 1220 may implement a corresponding communication function. The transceiver module 1220 may also be referred to as a communication interface or a communication unit.

Optionally, the communication apparatus 1200 may further include a storage module. The storage module may be configured to store instructions and/or data. The processing module 1210 may read the instructions and/or the data in the storage unit, so that the communication apparatus implements the foregoing method embodiment.

The communication apparatus 1200 may be configured to perform actions performed by the transmit end device in the method 200 in the foregoing method embodiment, and the communication apparatus 1200 may be a transmit end device or a component that may be configured in the transmit end device. The transceiver module 1220 is configured to perform sending and receiving-related operations of the transmit end device in the method 200 in the foregoing method embodiment, and the processing module 1210 is configured to perform processing-related operations on the transmit end device side in the foregoing method embodiment.

When the communication apparatus 1200 is configured to perform the method 200 in FIG. 2, the processing module 1210 may be configured to perform step 210 in the method 200, and the transceiver module 1220 may be configured to perform step 220 in the method 200.

When the communication apparatus 1200 is configured to perform the method 1000 in FIG. 10, the processing module 1210 may be configured to perform step 1010 in the method 1000, and the transceiver module 1220 may be configured to perform step 1020 in the method 1000.

Specifically, the processing module 1210 is configured to map a first data channel to a symbol other than at least one first symbol in first symbols to be mapped to, and/or the processing module 1210 is further configured to map a second data channel to a symbol other than at least one first symbol in second symbols to be mapped to. A beam corresponding to the first data channel is different from a beam corresponding to the second data channel, M second symbols are included between the first symbols to be mapped to and the second symbols to be mapped to, the second symbol is a symbol to which the first data channel and the second data channel are not mapped, the first symbol is adjacent to the second symbol, M is an integer and M≥0, and a sum of a quantity of first symbols and a quantity of second symbols is equal to a first threshold. The transceiver module 1220 is configured to send signals on the first data channel and the second data channel.

Optionally, the processing module 1210 is further configured to map a reference signal to an N$^{th}$ symbol after a third symbol, where the N$^{th}$ symbol is determined based on a location of a symbol to which the reference signal is to be mapped, the third symbol includes the first symbol and the second symbol, and N is a positive integer greater than or equal to 1; and the transceiver module 1220 is further configured to send the reference signal.

Optionally, the symbol to which the reference signal is to be mapped overlaps the third symbol; or there is no symbol, in the second symbols to be mapped to, to which the reference signal is to be mapped, where the second symbols to be mapped to are after the first symbols to be mapped to.

Optionally, the processing module 1210 is further configured to skip mapping a first signal to the third symbol, where a symbol to which the first signal is to be mapped overlaps the third symbol, and the first signal includes a control resource set.

Optionally, switching from the beam corresponding to the first data channel to the beam corresponding to the second data channel is started at a beam switching location, where the beam switching location is before the third symbol.

Optionally, the first symbols to be mapped to are determined based on first resource indication information, the second symbols to be mapped to are determined based on second resource indication information, the first resource indication resource information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

Optionally, the first data channel is a first physical downlink shared channel PDSCH, and the second data channel is a second PDSCH; or the first data channel is a first physical uplink shared channel PUSCH, and the second data channel is a second PUSCH.

Optionally, when the first data channel is the first physical downlink shared channel PDSCH, the processing module 1210 is further configured to map the first PDSCH to the first symbols to be mapped to, where a beam corresponding to the first PDSCH is the same as a first beam.

Optionally, the first beam is a second beam or a third beam, the second beam is a beam corresponding to first indication information or a preconfigured beam, and the third beam is a beam corresponding to the first indication information, a beam indicated by the first indication information, or a preconfigured beam.

Optionally, the first symbols to be mapped to are before an end location of first duration, and the processing module 1210 is specifically configured to map the first PDSCH to the first symbols to be mapped to, where the beam corresponding to the first PDSCH is the same as the second beam, where the first duration is associated with processing time of a terminal device.

Optionally, the first symbols to be mapped to are after an end location of first duration, and the processing module 1210 is specifically configured to map the first PDSCH to the first symbols to be mapped to, where the first PDSCH has a high priority, and the beam corresponding to the first PDSCH is the same as the third beam, where the first duration is associated with processing time of a terminal device.

Optionally, the processing module 1210 is further configured to obtain second indication information, where the second indication information indicates that the beam corresponding to the first PDSCH is different from a beam corresponding to a third PDSCH, and the third PDSCH is before the first PDSCH.

Figure 13:
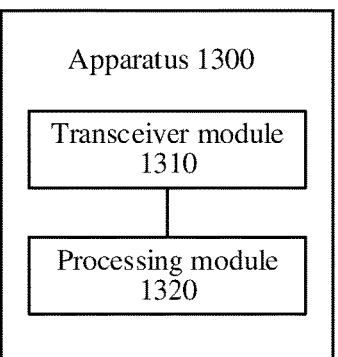
FIG. 13 is a schematic block diagram of a resource mapping apparatus 1300 according to an embodiment of this application.

FIG. 13 is a schematic block diagram of a communication apparatus according to an embodiment of this application. The communication apparatus 1300 includes a transceiver module 1310 and a processing module 1320. The processing module 1320 is configured to process data, and the transceiver module 1310 may implement a corresponding communication function. The transceiver module 1310 may also be referred to as a communication interface or a communication unit.

Optionally, the communication apparatus 1300 may further include a storage module. The storage module may be configured to store instructions and/or data. The processing module 1320 may read the instructions and/or the data in the storage unit, so that the communication apparatus implements the foregoing method embodiment.

The communication apparatus 1300 may be configured to perform actions performed by the receive end device in the method 200 in the foregoing method embodiment, and the communication apparatus 1300 may be a transmit end device or a component that may be configured in the transmit end device. The transceiver module 1310 is configured to perform sending and receiving-related operations of the receive end device in the method 200 in the foregoing method embodiment, and the processing module 1320 is configured to perform processing-related operations on the receive end device side in the foregoing method embodiment.

When the communication apparatus 1300 is configured to perform the method 200 in FIG. 2, the transceiver module 1310 may be configured to perform step 220 in the method 200, and the processing module 1320 may be configured to perform step 230 in the method 200.

When the communication apparatus 1300 is configured to perform the method 1000 in FIG. 10, the transceiver module 1310 may be configured to perform step 1020 in the method 1000, and the processing module 1320 may be configured to perform step 1030 in the method 1000.

Specifically, the transceiver module 1310 is configured to receive signals of a first data channel and a second data channel, where a beam corresponding to the first data channel is different from a beam corresponding to the second data channel, the first data channel is mapped to a symbol other than at least one second symbol in first symbols to be mapped to and/or the second data channel is mapped to a symbol other than at least one second symbol in second symbols to be mapped to, M first symbols are included between the first symbols to be mapped to and the second symbols to be mapped to, the first symbol is a symbol to which the first data channel and the second data channel are not mapped, the first symbol is adjacent to the second symbol, M is an integer and M≥0, and a sum of a quantity of second symbols and a quantity of first symbols is equal to a first threshold. The processing module 1320 is configured to process the received signals.

Optionally, the transceiver module 1310 is further configured to receive a reference signal, where the reference signal is mapped to an $N^{th}$ symbol after a third symbol, the $N^{th}$ symbol is determined based on a location of a symbol to which the reference signal is to be mapped, the third symbol includes the first symbol and the second symbol, and N is a positive integer greater than or equal to 1; and the processing module 1320 is further configured to process the received reference signal.

Optionally, the symbol to which the reference signal is to be mapped overlaps the third symbol; or there is no symbol, in the second symbols to be mapped to, to which the reference signal is to be mapped, where the second symbols to be mapped to are after the first symbols to be mapped to.

Optionally, the processing module 1320 is further configured to determine that a first signal is not mapped to the third symbol, where the first signal includes a control resource set, and a symbol to which the first signal is to be mapped overlaps the third symbol.

Optionally, the processing module 1320 is further configured to start to switch from the beam corresponding to the first data channel to the beam corresponding to the second data channel at a beam switching location, where the beam switching location is before the third symbol.

Optionally, the first symbols to be mapped to are determined based on first resource indication information, the second symbols to be mapped to are determined based on second resource indication information, the first resource indication information indicates the symbol to which the first data channel is mapped, and the second resource indication information indicates the symbol to which the second data channel is mapped, where a value range of the first resource indication information is determined based on the first threshold, and a value range of the second resource indication information is determined based on the first threshold.

Optionally, the first data channel is a first physical downlink shared channel PDSCH, and the second data channel is a second PDSCH; or the first data channel is a first physical uplink shared channel PUSCH, and the second data channel is a second PUSCH.

Optionally, when the first data channel is the first physical downlink shared channel PDSCH, the processing module 1320 is further configured to determine that the first PDSCH is mapped to the first symbols to be mapped to, where a beam corresponding to the first PDSCH is the same as a first beam.

Optionally, the first beam is a second beam or a third beam, the second beam is a beam corresponding to first indication information or a preconfigured beam, and the third beam is a beam corresponding to the first indication information, a beam indicated by the first indication information, or a preconfigured beam.

Optionally, the first symbols to be mapped to are before an end location of first duration, and the processing module 1320 is specifically configured to determine that the first PDSCH is mapped to the first symbols to be mapped to, where the beam corresponding to the first PDSCH is the same as the second beam, where the first duration is associated with processing time of a terminal device.

Optionally, the first symbols to be mapped to are after an end location of first duration, and the processing module 1320 is specifically configured to determine that the first PDSCH is mapped to the first symbols to be mapped to, where the first PDSCH has a high priority, and the beam corresponding to the first PDSCH is the same as the third beam, where the first duration is associated with processing time of a terminal device.

Optionally, the processing module 1320 is further configured to obtain second indication information, where the second indication information indicates that the beam corresponding to the first PDSCH is different from a beam corresponding to a third PDSCH, and the third PDSCH is before the first PDSCH.

The processing module 1210 or 1320 in the foregoing embodiments may be implemented by at least one processor or a processor-related circuit. The transceiver module 1220 or 1310 may be implemented by a transceiver or a transceiver-related circuit. The transceiver module may also be referred to as a communication unit or a communication interface. The storage unit may be implemented by at least one memory.

Figure 14:
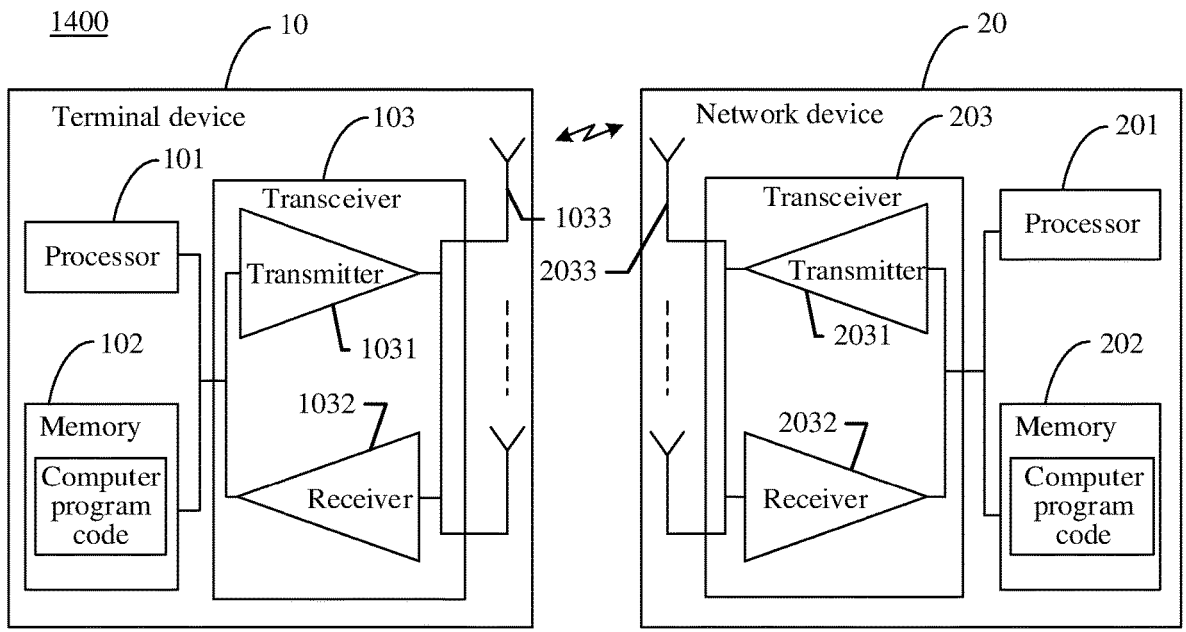
FIG. 14 is a schematic block diagram of a communication system according to an embodiment of this application.

As shown in FIG. 14, an embodiment of this application further provides a communication system 1400. The communication system 1400 includes at least one terminal device 10 and at least one network device 20.

The terminal device 10 includes a processor 101, a memory 102, and a transceiver 103. The processor 101 is coupled to the memory 102. The memory 102 is configured to store a computer program or instructions and/or data, and the processor 101 is configured to execute the computer program or the instructions and/or the data stored in the memory 102, so that the method in the foregoing method embodiment is performed.

Optionally, the terminal device 10 includes one or more processors 101.

Optionally, the terminal device 10 may include one or more memories 102.

Optionally, the memory 102 and the processor 101 may be integrated, or separately disposed.

Optionally, as shown in FIG. 14, the terminal device 10 may further include a transceiver 103. The transceiver 103 is configured to receive and/or send a signal. The transceiver 103 includes a transmitter 1031, a receiver 1032, and an antenna 1033. For example, the processor 101 is configured to control the receiver 1032 and the transmitter 1031 to receive and/or send signals. The receiver 1032 may be configured to receive transmission control information through the antenna 1033, and the transmitter 1031 may be configured to send transmission information to the network device 20 through the antenna 1033.

In a solution, the terminal device 10 is configured to implement operations performed by the terminal device in the foregoing method embodiment.

For example, the processor 101 is configured to implement processing-related operations performed by the terminal device in the foregoing method embodiment, and the transceiver 103 is configured to implement sending and receiving-related operations performed by the terminal device in the foregoing method embodiment.

The network device 20 includes a processor 201, a memory 202, and a transceiver 203. The processor 201 is coupled to the memory 202. The memory 202 is configured to store a computer program or instructions and/or data, and the processor 201 is configured to execute the computer program or the instructions and/or the data stored in the memory 202, so that the method in the foregoing method embodiment is performed.

Optionally, the network device 20 includes one or more processors 201.

Optionally, the network device 20 may include one or more memories 202.

Optionally, the memory 202 and the processor 201 may be integrated, or separately disposed.

Optionally, as shown in FIG. 14, the network device 20 may further include a transceiver 203. The transceiver 203 is configured to receive and/or send a signal. The transceiver 203 includes a transmitter 2031, a receiver 2032, and an antenna 2033. For example, the processor 201 is configured to control the receiver 2032 and the transmitter 2031 to receive and/or send signals. The transmitter 2031 may be configured to send the transmission control configuration information to the terminal device 10 through the antenna 2033, and the receiver 2032 may be configured to receive, through the antenna 2033, the transmission information sent by the terminal device 10.

In a solution, the network device 20 is configured to implement operations performed by the network device in the foregoing method embodiment.

For example, the processor 201 is configured to implement processing-related operations performed by the network device in the foregoing method embodiment, and the transceiver 203 is configured to implement sending and receiving-related operations performed by the network device in the foregoing method embodiment.

In addition, this application further provides a computer-readable storage medium. The computer-readable storage medium stores computer instructions. When the computer instructions are run on a computer, operations and/or procedures in the method embodiments of this application are performed.

This application further provides a computer program product. The computer program product includes computer program code or instructions. When the computer program code or the instructions are run on a computer, operations and/or procedures in the method embodiments of this application are performed.

In addition, this application further provides a chip, and the chip includes a processor. A memory configured to store a computer program is disposed independently of the chip, and the processor is configured to execute the computer program stored in the memory, so that operations and/or processing in any method embodiment is performed.

Further, the chip may include a communication interface. The communication interface may be an input/output interface, an interface circuit, or the like. Further, the chip may include the memory.

It should be understood that, an "embodiment" mentioned throughout this specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that, in embodiments of this application, numbers "first", "second", and the like are merely intended to distinguish between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations.

It should be further understood that in embodiments of this application, "B corresponding to A" indicates that B is associated with A, and B may be determined based on A. However, it should be further understood that determining B based on A does not mean that B is determined based on only A, and B may alternatively be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, a terminal device and/or a radio access network device may perform some or all steps in embodiments of this application. These steps or the operations are merely examples. In embodiments of this application, other operations or various variations of the operations may be further performed. In addition, the steps may be performed in a sequence different from a sequence presented in embodiments of this application, and not all the operations in embodiments of this application may be performed.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource mapping method applied to an electronic device, the method comprising:
   mapping a first data channel to a symbol other than at least one first symbol in a first resource, and/or mapping a second data channel to a symbol other than the at least one first symbol in a second resource, wherein
   a beam corresponding to the first data channel is different from a beam corresponding to the second data channel, M second symbols that will not be mapped to are comprised between the first resource and the second resource, each of the M second symbols is a symbol to which the first data channel and the second data channel are not mapped, the at least one first symbol is adjacent to one of the M second symbols, M is an integer and M≥0, and a sum of a quantity of the at least one first symbol and a quantity of second symbols to be mapped to is equal to a first threshold; and sending signals on the first data channel and the second data channel;

mapping a reference signal to an $N^{th}$ symbol after a third symbol;

starting to switch from the beam corresponding to the first data channel to the beam corresponding to the second data channel at a beam switching location, wherein the beam switching location is before the third symbol; and sending the reference signal.

2. The method according to claim 1, wherein the $N^{th}$ symbol is determined based on a location of a symbol to which the reference signal is to be mapped, and the third symbol comprises the at least one first symbol and at least one of the second symbols to be mapped to, and N is a positive integer greater than or equal to 1.

3. The method according to claim 2, wherein the symbol to which the reference signal is to be mapped overlaps the third symbol.

4. The method according to claim 2, wherein there is no symbol, in the second resource, to which the reference signal is to be mapped, wherein the second resource is after the first resource.

5. The method according to claim 1, further comprising:

based on a symbol to which a first signal is to be mapped overlapping the third symbol, skipping mapping the first signal to the third symbol, wherein the first signal comprises a control resource set.

6. The method according to claim 1, wherein the first resource is determined based on first resource indication information, the second resource is determined based on second resource indication information, the first resource indication information indicates the symbol to which the first data channel is mapped, and the second resource indication information indicates the symbol to which the second data channel is mapped, wherein a value range of the first resource indication information is determined based on the first threshold, and a value range of the second resource indication information is determined based on the first threshold.

7. The method according to claim 1, wherein the third symbol is a switching symbol, which is required for beam switching.

8. A resource mapping method applied to an electronic device, the method comprising:

receiving signals of a first data channel and a second data channel, wherein a direction of a beam corresponding to the first data channel is different from a direction of a beam corresponding to the second data channel, the first data channel is mapped to a symbol other than at least one second symbol in a first resource and/or the second data channel is mapped to a symbol other than the at least one second symbol in a second resource, M first symbols that will not be mapped to are comprised between the first resource and the second resource, each of the M first symbol is a symbol to which the first data channel and the second data channel are not mapped, and one of the M first symbol is adjacent to the at least one second symbol, M is an integer and M≥0, and a sum of a quantity of the at least one second symbol and a quantity of first symbols to be mapped to is equal to a first threshold;

processing the received signals;

receiving a reference signal, wherein the reference signal is mapped to an $N^{th}$ symbol after a third symbol;

starting to switch from the beam corresponding to the first data channel to the beam corresponding to the second data channel at a beam switching location, wherein the beam switching location is before the third symbol; and processing the received reference signal.

9. The method according to claim 8, wherein the $N^{th}$ symbol is determined based on a location of a symbol to which the reference signal is to be mapped, and the third symbol comprises at least one of the first symbols to be mapped to and the at least one second symbol, and N is a positive integer greater than or equal to 1.

10. The method according to claim 9, wherein the symbol to which the reference signal is to be mapped overlaps the third symbol.

11. The method according to claim 9, wherein there is no symbol, in the second resource, to which the reference signal is to be mapped, wherein the second resource is after the first resource.

12. The method according to claim 8, further comprising:

based on a symbol to which a first signal is to be mapped overlapping the third symbol, the first signal is not mapped to the third symbol, and the first signal comprises a control resource set.

13. The method according to claim 8, wherein the first resource is determined based on first resource indication information, the second resource is determined based on second resource indication information, the first resource indication information indicates the symbol to which the first data channel is mapped, and the second resource indication information indicates the symbol to which the second data channel is mapped, wherein a value range of the first resource indication information is determined based on the first threshold, and a value range of the second resource indication information is determined based on the first threshold.

14. The method according to claim 8, wherein the third symbol is a switching symbol, which is required for beam switching.

15. A resource mapping apparatus, wherein the apparatus comprises:

a processor, configured to: map a first data channel to a symbol other than at least one first symbol in a first resource, and/or map a second data channel to a symbol other than the at least one first symbol in a second resource, wherein a beam corresponding to the first data channel is different from a beam corresponding to the second data channel, M second symbols that will not be mapped to are comprised between the first resource and the second resource, each of the M second symbol is a symbol to which the first data channel and the second data channel are not mapped, the at least one first symbol is adjacent to one of the M second symbols, and M is an integer and M≥0, and a sum of a quantity of the at least one first symbol and a quantity of second symbols to be mapped to is equal to a first threshold; and a transceiver, configured to cooperate with the processor to send signals on the first data channel and the second data channel;

wherein the processor is further configured to:

map a reference signal to an $N^{th}$ symbol after a third symbol;

start to switch from the beam corresponding to the first data channel to the beam corresponding to the second data channel at a beam switching location, wherein the beam switching location is before the third symbol; and wherein the transceiver is further configured to cooperate with the processor to send the reference signal.

16. The apparatus according to claim 15, wherein the $N^{th}$ symbol is determined based on a location of a symbol to which the reference signal is to be mapped, and the third symbol comprises the at least one first symbol and at least one of the second symbols to be mapped to, and N is a positive integer greater than or equal to 1.

17. The apparatus according to claim 16, wherein the symbol to which the reference signal is to be mapped overlaps the third symbol.

18. The apparatus according to claim 16, wherein there is no symbol, in the second resource, to which the reference signal is to be mapped, wherein the second resource is after the first resource.

19. The apparatus according to claim 15, wherein the processor is further configured to:

skip mapping a first signal to the third symbol, wherein a symbol to which the first signal is to be mapped overlaps the third symbol, and the first signal comprises a control resource set.

20. The apparatus according to claim 15, wherein the first resource is determined based on first resource indication information, the second resource is determined based on second resource indication information, the first resource indication information indicates the symbol to which the first data channel is mapped, and the second resource indication information indicates the symbol to which the second data channel is mapped, wherein a value range of the first resource indication information is determined based on the first threshold, and a value range of the second resource indication information is determined based on the first threshold.

* * * * *